US012600570B2

(12) United States Patent
Chen et al.

(10) Patent No.: US 12,600,570 B2
(45) Date of Patent: Apr. 14, 2026

(54) GOODS LOADING OR UNLOADING CONTROL METHOD, CONTROL DEVICE, GOODS LOADING OR UNLOADING DEVICE, AND WAREHOUSING SYSTEM

(71) Applicant: HAI ROBOTICS CO., LTD., Shenzhen (CN)

(72) Inventors: Yeguang Chen, Shenzhen (CN); Zhe Kong, Shenzhen (CN); Ming Gao, Shenzhen (CN); Wenzhe Lai, Shenzhen (CN); Zhikai Yan, Shenzhen (CN)

(73) Assignee: HAI ROBOTICS CO., LTD., Shenzhen (CN)

( * ) Notice: Subject to any disclaimer, the term of this patent is extended or adjusted under 35 U.S.C. 154(b) by 334 days.

(21) Appl. No.: 18/338,875

(22) Filed: Jun. 21, 2023

(65) Prior Publication Data

US 2023/0331482 A1     Oct. 19, 2023

Related U.S. Application Data

(63) Continuation of application No. PCT/CN2021/136196, filed on Dec. 7, 2021.

(30) Foreign Application Priority Data

Dec. 24, 2020    (CN) .......................... 202011555916.5

(51) Int. Cl.
B65G 1/137        (2006.01)
B65G 1/127        (2006.01)
(52) U.S. Cl.
CPC ............. B65G 1/137 (2013.01); B65G 1/127 (2013.01); B65G 1/1376 (2013.01)

(58) Field of Classification Search
CPC ....... B65G 1/127; B65G 1/137; B65G 1/1376
(Continued)

(56) References Cited

U.S. PATENT DOCUMENTS

2006/0178774 A1 * 8/2006 Reznik ...................... B07C 5/36
209/583
2010/0276555 A1 * 11/2010 Steffen ................. G01C 15/004
248/274.1
(Continued)

FOREIGN PATENT DOCUMENTS

AT        501897 B1 * 12/2006 ........... B65G 1/1376
CN    101223635 A * 7/2008 ....... H01L 21/67733
(Continued)

OTHER PUBLICATIONS

1 The Third Office Action and its translation for Chinese Application No. 202011555916.5, dated Dec. 8, 2022.
(Continued)

*Primary Examiner* — Terrell H Matthews
(74) *Attorney, Agent, or Firm* — Ladas & Parry, LLP

(57)            ABSTRACT
A goods loading or unloading control method is applicable to a goods loading or unloading device. The goods loading or unloading device includes a storage unit. The storage unit is provided with a goods outlet and a roller conveyor. The roller conveyor has an outer contour surface configured for rolling contact with goods in the storage unit. The roller conveyor is configured to rotate about a rotation axis thereof. The method includes: receiving a goods loading or unloading instruction; and controlling a rotation state of the roller conveyor according to the goods loading or unloading instruction, so as to convey goods outside the storage unit to outside of the goods outlet through the storage unit.

20 Claims, 11 Drawing Sheets

(58) Field of Classification Search
USPC ........................................................ 414/267
See application file for complete search history.

(56) References Cited

U.S. PATENT DOCUMENTS

| | | | | |
|---|---|---|---|---|
| 2015/0278463 A1* | 10/2015 | Tolle | ...................... | G16H 30/20 |
| | | | | 705/4 |
| 2019/0241364 A1 | 8/2019 | La Rovere et al. | | |
| 2019/0381605 A1* | 12/2019 | Madelone, Jr. | ......... | B22F 12/45 |
| 2023/0034430 A1* | 2/2023 | Chen | ........................ | B65G 1/02 |

FOREIGN PATENT DOCUMENTS

| | | | |
|---|---|---|---|
| CN | 204643108 U | 9/2015 | |
| CN | 105460573 A | 4/2016 | |
| CN | 106395281 A | 2/2017 | |
| CN | 208103262 U | 11/2018 | |
| CN | 109422078 A | 3/2019 | |
| CN | 110239870 A | 9/2019 | |
| CN | 210236086 U | 4/2020 | |
| CN | 111332733 A | 6/2020 | |
| CN | 111348361 A | 6/2020 | |
| CN | 111465566 A | 7/2020 | |
| CN | 111470242 A * | 7/2020 | ........... B65G 1/1373 |
| CN | 111634597 A | 9/2020 | |
| CN | 112678391 A * | 4/2021 | ............. B65G 1/137 |
| CN | 111634597 B * | 9/2021 | ............... B65G 1/04 |
| CN | 214826276 U | 11/2021 | |
| DE | 4034592 A1 | 5/1992 | |
| DE | 19940978 A1 * | 3/2001 | ........... B65G 1/1378 |
| EP | 2560899 B1 * | 8/2017 | ......... B65G 47/5104 |
| EP | 3459880 A1 * | 3/2019 | ........... B65G 1/1378 |
| JP | 2015063397 A * | 4/2015 | ............... G06F 1/00 |
| KR | 20160141843 A * | 12/2016 | ............. B65G 1/065 |
| TW | 546234 B * | 8/2003 | ............. B65G 1/137 |
| WO | WO-2020006010 A1 * | 1/2020 | ........... B65G 1/0407 |
| WO | WO-2022135140 A1 * | 6/2022 | ............. B65G 1/137 |

OTHER PUBLICATIONS

International Search Report mailed Mar. 10, 2022; PCT/CN2021/136196.

* cited by examiner

100 a goods loading or unloading instruction is received ⟋S100 a rotation state of a roller conveyor is controlled according to the goods loading or unloading instruction, so as to convey goods outside a storage unit to outside of a goods outlet through the storage unit in cooperation with a goods transport mechanism ⟋S200

300

| Processor | Memory |

301      302

Control system

GOODS LOADING OR UNLOADING CONTROL METHOD, CONTROL DEVICE, GOODS LOADING OR UNLOADING DEVICE, AND WAREHOUSING SYSTEM

CROSS-REFERENCE TO RELATED APPLICATIONS

This application is a continuation of International Patent Application No. PCT/CN2021/136196 filed on Dec. 7, 2021, which claims priority to Chinese Patent Application No. 202011555916.5, filed with the China National Intellectual Property Administration on Dec. 24, 2020 and entitled "GOODS LOADING OR UNLOADING CONTROL METHOD, CONTROL DEVICE, GOODS LOADING OR UNLOADING DEVICE, AND WAREHOUSING SYSTEM", which are incorporated herein by reference in their entirety.

TECHNICAL FIELD

The present invention relates to the technical field of intelligent warehousing, and in particular to, a goods loading or unloading control method, a control device, a goods loading or unloading device, and a warehousing system.

BACKGROUND

Warehousing emerges with storage of goods and materials and develops with the development of industrial technology. Warehousing is an important pillar of logistics activities and also a crucial part of modern industrial development.

In the existing warehousing system, mechanization and automation have been partially realized. For example, goods can be transported to different shelving units by a transport robot for warehousing, or goods on the shelving units can be transported to the outlet of the warehousing system by the transport robot for retrieval. However, even if the mechanization and automation are realized to a certain extent, some tasks still need human assistance. For example, when the goods arrive at the entrance of the warehousing system, it is necessary to manually perform feeding on the transport robot, or when the goods need to be retrieved, it is also necessary to manually take the goods on the transport robot for retrieval, or when the goods on the transport robot are distributed to different production lines, it is also necessary to manually unload the goods on the transport robot to different production lines. When more than one tray is arranged on the transport robot and the tray is at a relatively high position, it is necessary to load/unload the goods layer by layer a plurality of times.

In the above warehousing system, due to the need to manually complete the loading or unloading process of goods, the degree of automation is relatively low and the operation efficiency is relatively poor.

SUMMARY

In view of the above problems, embodiments of the present invention provide a goods loading or unloading control method, a control device, a goods loading or unloading device, and a warehousing system, so that the feeding and discharging processes of goods can be automatically completed, the degree of automation is relatively high, and the operation efficiency is also improved.

In order to achieve the foregoing objective, the embodiments of the present invention provide the following technical solutions.

An embodiment of the present invention provides a goods loading or unloading control method, applicable to a goods loading or unloading device. The goods loading or unloading device includes a storage unit. The storage unit is provided with a goods outlet and a roller conveyor. The roller conveyor has an outer contour surface configured for rolling contact with goods in the storage unit. The roller conveyor is configured to rotate about a rotation axis thereof. The method includes:

receiving a goods loading or unloading instruction; and
controlling a rotation state of the roller conveyor according to the goods loading or unloading instruction, so as to convey goods outside the storage unit to outside of the goods outlet through the storage unit in cooperation with a goods transport mechanism.

A second aspect of the embodiments of the present invention provides a control device, including: a processor; and a memory, communicatively connected to the processor, the memory storing executable code, the executable code, when executed by the processor, causing the processor to perform the above goods loading or unloading control method.

A third aspect of the embodiment of the present invention provides a goods loading or unloading device, including a support and a control assembly. A storage unit configured for goods to be placed is arranged on the support, a goods outlet and a roller conveyor are arranged on the storage unit, the roller conveyor has an outer contour surface configured for rolling contact with the goods in the storage unit.

The control assembly includes a driving unit configured to drive the roller conveyor to rotate and the above control device. The driving unit is electrically connected to the control device. The control device is configured to control a rotation state of the roller conveyor, so as to convey goods to outside of the goods outlet through the storage unit in cooperation with a goods transport mechanism.

A fourth aspect of the embodiments of the present invention provides a warehousing system, including a transport robot and the goods loading or unloading device. The transport robot is provided with a tray, and the tray is arranged corresponding to the storage unit of the goods loading or unloading device to perform a goods loading or unloading operation with the goods loading or unloading device.

The embodiments of the present invention have the following advantages.

The goods loading or unloading device is used for feeding or discharging, and since the roller conveyor in rolling contact with the goods is arranged in the goods loading or unloading device, the rotation of the roller conveyor can generate a traction force for the goods. When the goods loading or unloading device is used in cooperation with the mechanisms such as the transport robot and the production line, the goods can be conveyed from the outside of the storage unit into the storage unit for automatic discharging by controlling the rotation of the roller conveyor to generate the traction force for the goods, and then the goods in the storage unit are conveyed to the outside of the goods outlet for automatic feeding. In the process, manual loading or unloading of goods is not required, and therefore the degree of automation is relatively high and the operation efficiency is relatively high.

DESCRIPTION OF REFERENCE NUMERALS

100, 500—Goods loading or unloading device; 200—Transport robot; 201—Shelving unit; 202—Mobile chassis; 203—Goods taking device; 204—Fixed support; 205—Tray; 300—Control device; 301—Processor; 302—Memory;

1—Support; 11—Post; 12—Support frame; 120—First support portion; 121—Front post; 122—Rear post; 123—Middle post; 124—Top frame; 13—Avoidance groove; 14—End connector; 141—Guide member; 2, 504—Storage unit; 22—Roller conveyor; 23—Loading space; 24—First storage unit; 25—Second storage unit; 3—Detection assembly; 31, 502—Goods inlet; 32, 503—Goods outlet; 33—First sensing unit; 331—Start switch; 332—Switch bracket; 333—Detection rocker arm; 34—First position detection sensor; 35—Second position detection sensor; 36—Stop structure; 37—Goods conveying channel; 5, 501—Manipulator; 51, 505—Movable member; 52—Movable push rod; 53—First movable member; 54—Second movable member; 6—Walking frame; 61—Support frame body; 611—Connecting plate; 62—Connecting beam; 63—Slide rail; 64—Slider; 8—Speed sensor; 81—First speed sensor; 82—Second speed sensor; 83—Third speed sensor; 84—Fourth speed sensor; 90—Feeding/discharging position detection sensor; 91—First position sensor; 92—Second position sensor; 93—Hoisting mechanism; 931—Bearing platform; 932—Lifting module.

DETAILED DESCRIPTION

In the existing warehousing system, as an important link, logistics robots such as transport robots can be used to convey goods to different shelving units or take the goods out of the shelving units. However, the feeding and discharging of the transport robots are still completed by manpower, which requires feeding or discharging layer by layer a plurality of times in a case that more than one tray on the transport robot or the tray height is relatively high, resulting in a low degree of automation in the logistics process and poor operation efficiency.

In order to solve the above problems, this application provides a goods loading or unloading control method, a control device, a goods loading or unloading device, and a warehousing system, so that the feeding and discharging of goods are automatically completed through the goods loading or unloading device, the degree of automation is relatively high, and the operation efficiency is also relatively high.

In order to make the objectives, features, and advantages of the embodiments of this application more apparent and easier to understand, the technical solutions of the embodiments of this application will be clearly and completely described below with reference to the accompanying drawings in the embodiments of this application.

Embodiment I

Figure 1:
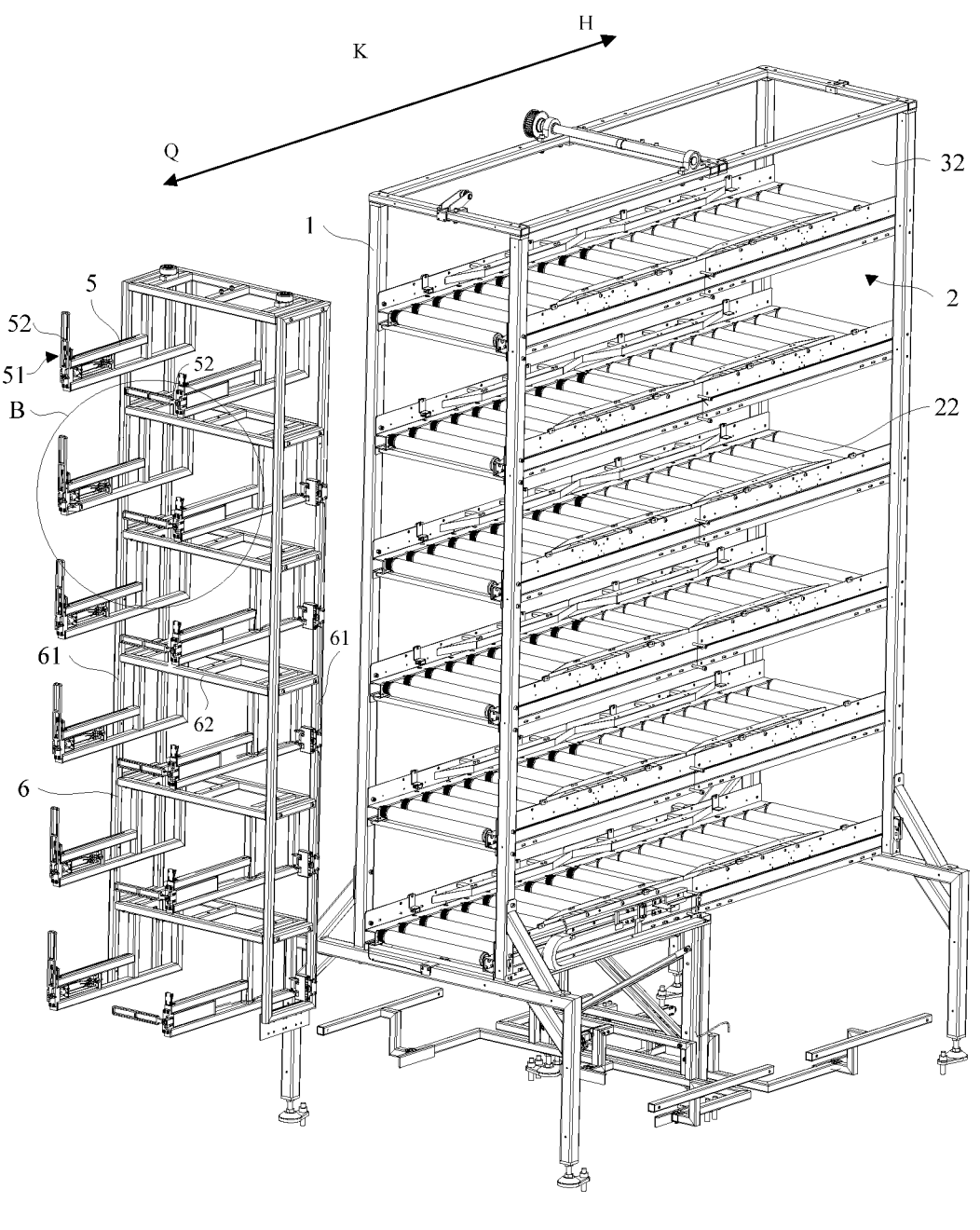
FIG. 1 is a schematic diagram of a breakdown structure of a goods loading or unloading device according to Embodiment I of this application.
Figure 2:
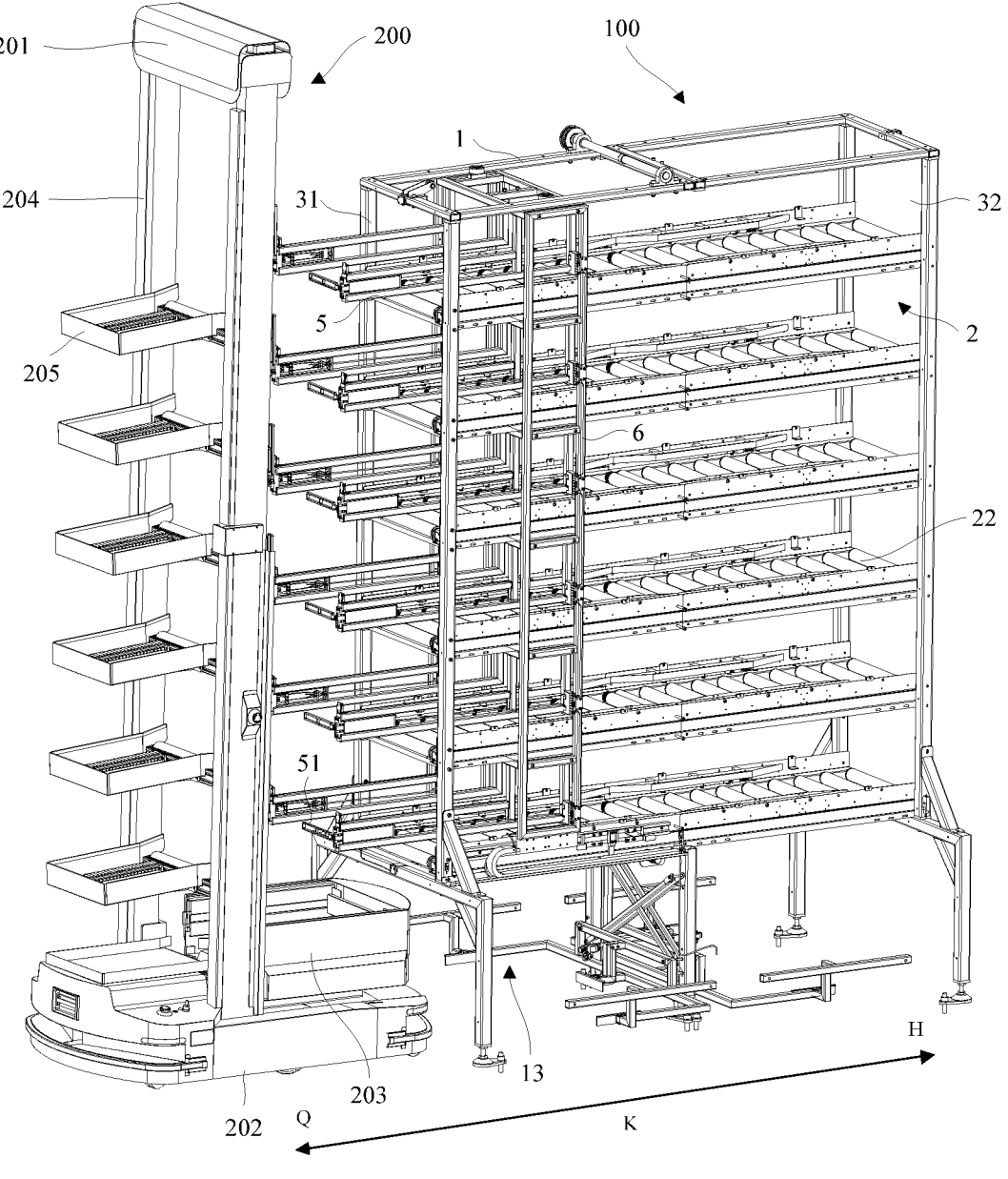
FIG. 2 is a schematic structural diagram of a goods loading or unloading device and a transport robot in a state of cooperation according to Embodiment I of this application.

FIG. 1 is a schematic diagram of a breakdown structure of a goods loading or unloading device according to Embodiment I of this application, and FIG. 2 is a schematic structural diagram of a goods loading or unloading device and a transport robot in a state of cooperation according to Embodiment I of this application.

Referring to FIG. 1 and FIG. 2, this application provides a goods loading or unloading device 100. The goods loading or unloading device includes a support 1 and a storage unit 2 arranged on the support 1. The storage unit 2 is provided with a goods outlet 32 and a roller conveyor 22. The roller conveyor 22 has an outer contour surface configured for rolling contact with goods in the storage unit 2. The roller conveyor 22 is configured to rotate about a rotation axis thereof, so as to convey goods from outside of the storage unit 2 into the storage unit 2 and then convey the goods to outside of the goods outlet 32 in cooperation with a goods transport mechanism. That is to say, the goods are conveyed to the outside of the storage unit 2 through the goods outlet 32.

In the above solution, the goods loading or unloading device 100 is configured to feed or discharge. Since the roller conveyor 22 in rolling contact with the goods is arranged in the goods loading or unloading device 100, the rotation of the roller conveyor 22 can generate a traction force for the goods. When the goods loading or unloading device 100 is used in cooperation with the mechanisms such as the transport robot 200 and the production line, the goods can be conveyed from the outside of the storage unit 2 into the storage unit 2 for automatic discharging by controlling the rotation of the roller conveyor 22 to generate the traction force for the goods, and then the goods in the storage unit 2 can be conveyed to the outside of the goods outlet 32 for automatic feeding. In the process, manual loading or unloading of goods is not required, and therefore the degree of automation is relatively high and the operation efficiency is relatively high.

In the embodiment of this application, in order to cause the roller conveyor 22 to rotate about an axis of rotation thereof, the goods loading or unloading device 100 further includes a driving assembly. The driving assembly includes a first driving device (not shown) arranged on the storage unit 2, and the first driving device is connected to the roller conveyor 22 and configured to drive the roller conveyor 22 to rotate. The goods loading or unloading device 100 further includes a controller. The first driving device is electrically connected to the controller, and the controller is configured to control the first driving device so that the first driving device drives the roller conveyor 22 to rotate about the axis of rotation thereof.

In the embodiment of this application, the goods transport mechanism may be a device used in cooperation with the goods loading or unloading device 100. For example, the goods transport mechanism may be a transport robot 200 or a production line. In some other examples, the goods transport mechanism may be further arranged on the goods loading or unloading device 100. For example, the goods transport mechanism includes a manipulator 5 that is movable relative to the storage unit 2, and the manipulator 5 is configured to move to drive the goods to move. In some examples, at least one movable member 51 is arranged on the manipulator 5, and the movable member 51 is movable relative to the manipulator 5 and arranged at a side of the goods in a conveying direction K for blocking.

In order to move the manipulator 5, in the embodiment of this application, the goods loading or unloading device 100 further includes a walking frame 6. The walking frame 6 is located at a side of the support 1. The manipulator 5 is connected to the walking frame 6, and the walking frame 6 is movable relative to the support 1 to drive the manipulator 5 to move relative to the storage unit 2.

In addition, the goods loading or unloading device 100 of the embodiment of this application further includes a lifting mechanism (not shown). The storage unit 2 is connected to the support 1 through the lifting mechanism, and the lifting mechanism is configured to drive the storage unit 2 to ascend or descend.

Referring to FIG. 2, an example of a transport robot 200 used in cooperation with this application is described below. The transport robot 200 includes a shelving unit 201, a mobile chassis 202, and a goods taking device 203. The shelving unit 201 is mounted on the mobile chassis 202. The shelving unit 201 may include a fixed support 204 and a plurality of trays 205. The plurality of trays 205 are arranged on the fixed support 204 at intervals in a vertical direction, and each of the trays 205 is configured for goods to be loaded. In addition, the mobile chassis 202 may be configured to realize the movement of the shelving unit 201 on the ground of a storage area. The goods taking device 203 may be mounted on the fixed support 204 and configured to place goods on the tray 205 or take out the goods on the tray 205.

It may be understood that the transport robot 200 that can cooperate with the goods loading or unloading device 100 of this application includes, but is not limited to, the structure shown in FIG. 2, or may include other structures. However, it is necessary to ensure that in the transport robot 200, the trays 205 and the storage units 2 of the goods loading or unloading device 100 are arranged in one-to-one correspondence, and a height of a goods bearing surface of the tray 205 is substantially the same as a height of a goods bearing surface of the storage unit 2, so that the goods can be moved smoothly between the storage unit 2 and the tray 205.

The feeding and discharging processes of the goods loading or unloading device 100 of this application are described below with reference to FIG. 2.

In the discharging process, the transport robot 200 starts from the position shown in FIG. 2 and moves toward the direction close to the goods loading or unloading device 100. When the transport robot 200 reaches a discharging position, that is, when the fixed support 204 of the transport robot 200 reaches the vicinity of a goods inlet of the goods loading or unloading device 100, the trays 205 of the transport robot 200 are in a one-to-one correspondence with the storage units 2. In this case, the manipulator 5 and the movable member 51 move and are located at a front side Q of a conveying direction K of the goods, and the movable member 51 is arranged at a side of the goods in the conveying direction K for blocking. Then, the manipulator 5 drives the movable member 51 to move toward the goods loading or unloading device 100, and the roller conveyor 22 rotates. In this case, under the combined action of the dragging of the movable member 51 and the traction force generated by the rotation of the roller conveyor 22, the goods start to move from the tray 205 toward the storage unit 2 until completely entering the storage unit 2, so that the discharging process can be completed. The goods on each tray 205 of each transport robot 200 may be simultaneously conveyed into the storage unit 2. During feeding of the transport robot 200, the transport robot 200 is located at a side of the goods outlet 32 or may still be located at a side of the goods inlet 31, and is used in cooperation with the goods loading or unloading device 100. The feeding process of the transport robot 200 is just the opposite of the above process. When the goods are conveyed from the storage unit 2 through the side opposite to the goods outlet 32 (the side of the goods inlet 31) by way of example for description, the movable member 51 is in an unfolded state and located at a rear side H of the goods, and can move from the rear side H to the front side Q under the drive of the manipulator 5. The movable member 51 abuts against the rear side H of the goods and pushes the goods until the goods enter the tray 205 of the transport robot, thereby realizing the feeding. Details are not described herein again.

In the embodiment of this application, in order to improve the loading or unloading efficiency of the goods loading or unloading device 100, the stability and safety of the goods loading or unloading device 100 need to be improved. The goods loading or unloading device 100 further includes a control assembly (not shown). The control assembly may include the above controller, a sensor electrically connected to the controller, and the like. The sensor in this application may include at least one of a speed sensor, a position sensor, or a feeding or discharging position sensor. In addition, in order to move the manipulator 5, the driving assembly may further include a second driving device configured to drive the walking frame 6 to move relative to the support 1.

The structure of each part in the goods loading or unloading device 100 is described in detail below.

Figure 3:
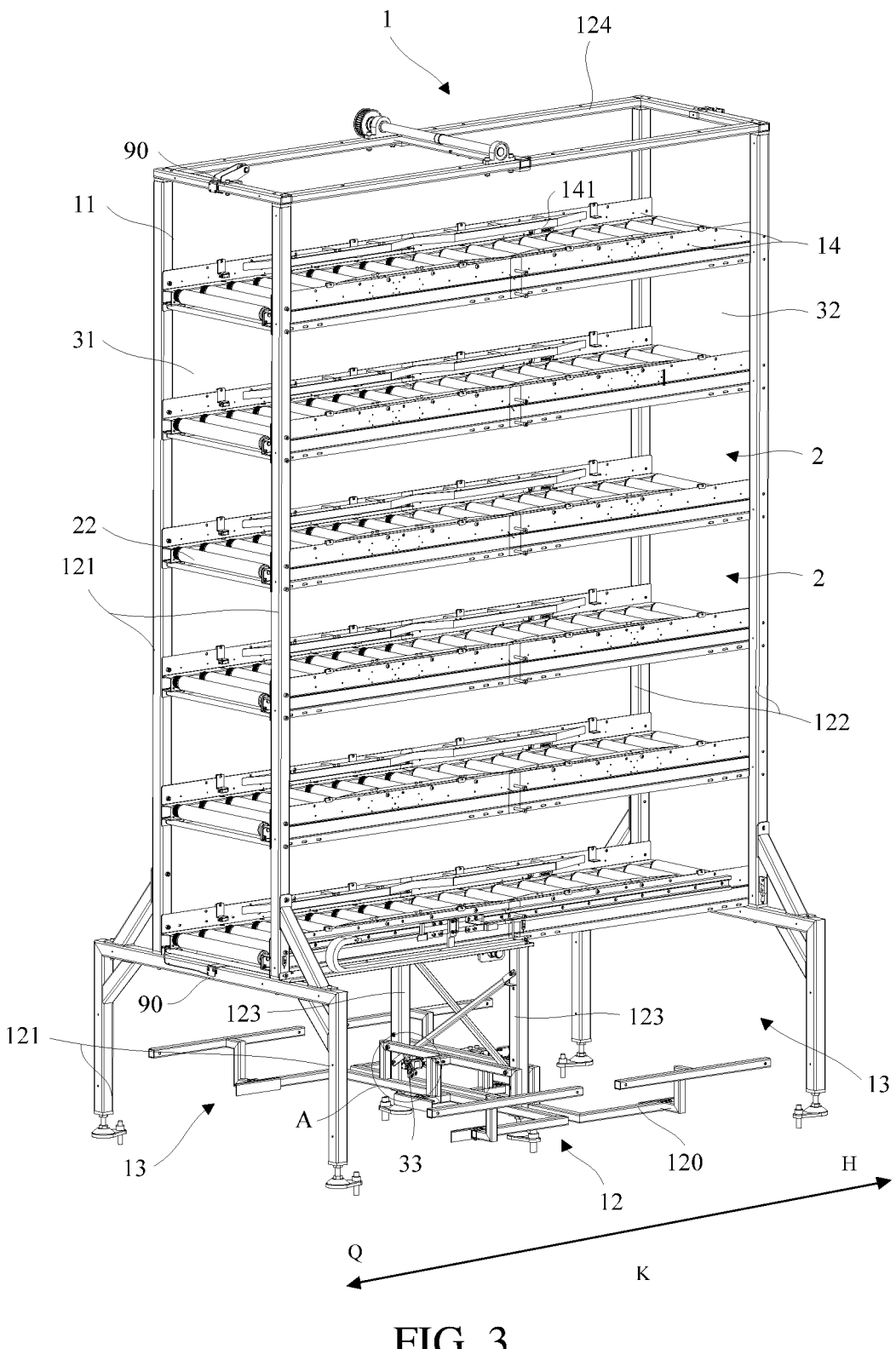
FIG. 3 is a schematic structural diagram of a support in a goods loading or unloading device according to Embodiment I of this application.

FIG. 3 is a schematic structural diagram of a support 1 in a goods loading or unloading device 100 according to the Embodiment I of this application.

Referring to FIG. 3, the support 1 includes a post 11 and a support frame 12. When a plurality of posts 11 are arranged, the support frame 12 may be located in intervals among the plurality of posts 11. A bottom of the support frame 12 and the posts 11 jointly support the goods loading or unloading device 100, and the support frame 12 includes a support portion 120 extending along the ground.

In the above solution, the support frame 12 is arranged, so that the support frame 12 and the posts 11 jointly support the goods loading or unloading device 100. The posts 11 play the main supporting role and the support frame 12 plays the auxiliary supporting role. Compared with the case that the goods loading or unloading device 100 is supported only by the posts 11 in the prior art, the mechanism for supporting the goods loading or unloading device 100 is increased, and further, since the first support portion 120 extends along the ground, a contact area between the support portion 120 and the ground can be increased, so that the goods loading or unloading device 100 is stably supported.

Referring to FIG. 3, the front side Q in the goods conveying direction K is marked with an arrow, and the direction opposite to the front side is the rear side H. For example, the post 11 in this application may include a front post 121 located at the front side of the support 1 in the goods conveying direction and a rear post 122 located at the rear side of the support 1 in the goods conveying direction. The number of posts 11 may be set as required. For example, in this application, the number of front posts 121 and the number of two rear posts 122 being both two is used as an example for description. The same is true for a case with another number, and the details are not described herein again.

The support frame 12 further includes a middle post 123. The middle post 123 is configured to support a middle part of the support 1 and is located between the front post 121 and the rear post 122, and is configured to support the part of the support 1 located between the front post 121 and the rear post 122. In the embodiment of this application, further, when the goods loading or unloading device 100 and the transport robot 200 are used together, in order to avoid the mobile chassis 202 of the transport robot 200, an avoidance groove 13 may be further arranged on the support 1.

Specifically, referring to FIG. 3, two avoidance grooves 13 may be arranged and are respectively located on the sides of the goods outlet 32 and the goods inlet 31 (the goods inlet is an opening arranged at a side on the storage unit facing away from the goods outlet). The avoidance groove 13 on the side of the goods inlet 31 is described as an example. When the support 1 includes a plurality of posts 11, for example, two front posts 121, two middle posts 123, and two rear posts 122, the two front posts 121 and two middle posts 123 are spaced apart from each other, and the two middle posts 123 and two rear posts 122 are spaced apart from each other, to form the avoidance groove 13 for avoiding the mobile chassis 202 of the transport robot 200. It may be understood that the opening of the avoidance groove 13 may face the transport robot 200, that is, the opening has the same opening direction as the goods outlet 32 or the goods inlet 31. It may be understood that the avoidance groove 13 herein refers to an avoidance space, which may be an open space formed by gaps between the posts as described above, or may be a relatively closed space formed by continuous avoidance chambers, as long as it can be used for the mobile chassis 202 of the transport robot 200 to enter, which is not limited in this application.

In the embodiment of this application, when the transport robot 200 is opposite to the goods loading or unloading device 100, it is possible that the goods loading or unloading device 100 performs the loading or unloading operation before the transport robot 200 reaches a preset feeding or discharging position. In this case, the loading or unloading failure is very likely to occur, resulting in low loading or unloading reliability. In order to avoid this situation, the control assembly may further include a sensing unit. The sensing unit is electrically connected to the controller. The sensing unit is arranged on the support 1 and is configured to transmit a sensing signal when the transport robot moves to the feeding position or the discharging position opposite to the goods loading or unloading device 100, so that the controller can control the driving assembly to perform the feeding or discharging operation according to the sensing signal.

Figure 4:
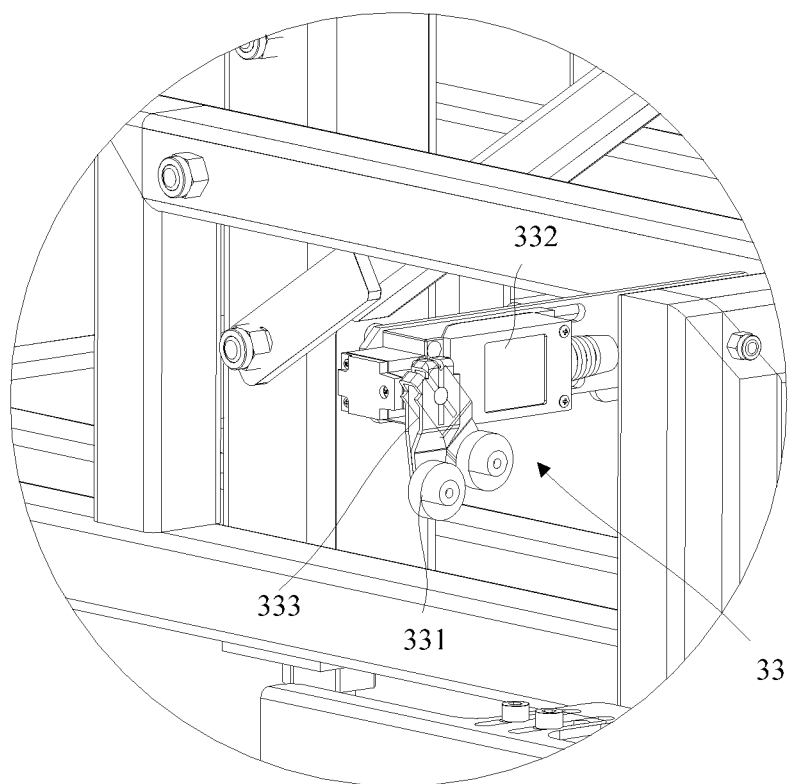
FIG. 4 is a partial enlarged view of a part A in FIG. 3.
Figure 5:
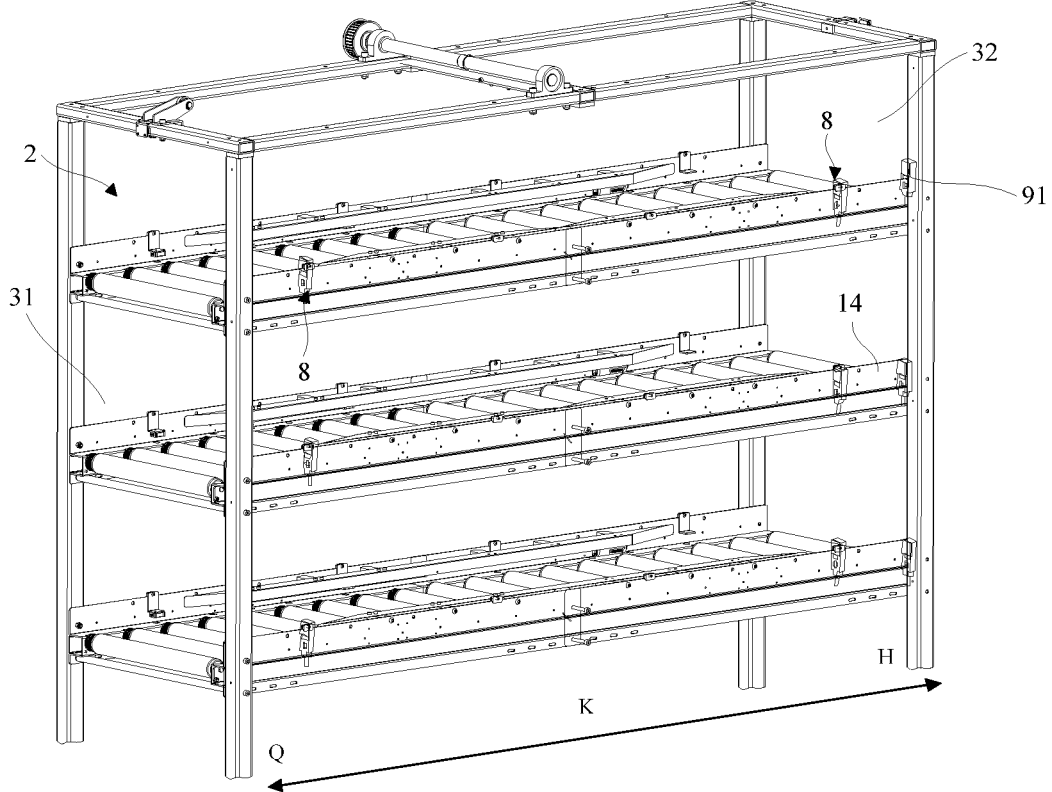
FIG. 5 is a partial schematic structural diagram of a support in a goods loading or unloading device according to Embodiment I of this application.

FIG. 4 is a partial enlarged view at a part A in FIG. 3, and FIG. 5 is a partial schematic structural diagram of a support in a goods loading or unloading device according to Embodiment I of this application. Referring to FIG. 3 and FIG. 4, in the embodiment of this application, as described above, the bottom of the support 1 is provided with an avoidance groove 13. The sensing unit may include a first sensing unit 33. The first sensing unit 33 is arranged in the avoidance groove 13, and the first sensing unit 33 is configured to transmit a sensing signal when the mobile chassis 202 of the transport robot 200 is accommodated in the avoidance groove 13. In the embodiment of this application, at least one first sensing unit 33 is arranged. For example, as shown in FIG. 3, the first sensing unit 33 may be located at a position opposite to the mobile chassis 202 of the transport robot 200.

In some other examples, in order to make the determination of the sensing unit more accurate, at least two first sensing units 33 are arranged, and different first sensing units 33 are arranged at different positions relative to the avoidance groove 13. The controller is configured to control the walking frame 6 to perform a loading or unloading operation when at least one first sensing unit 33, for example, each of all the first sensing units 33, transmits a sensing signal. In this way, a case that some of the first sensing units 33 fail and the transport robot 200 cannot be accurately measured may be avoided.

Referring to FIG. 3 and FIG. 4, for example, the first sensing unit 33 may include a start switch 331. The start switch 331 is located in the avoidance groove 13 and may be electrically connected to the controller. The start switch 331 is configured to touch the transport robot 200 when the transport robot 200 moves into the avoidance groove 13, so as to transmit a sensing signal to the controller.

In the embodiment of this application, the start switch 331 includes a switch bracket 332 and a detection rocker arm 333. A first end of the detection rocker arm 333 is rotatably connected to the switch bracket 332, and a second end of the detection rocker arm 333 is located in the avoidance groove 13 for touching the transport robot 200. The switch bracket 332 can transmit a sensing signal when the detection rocker arm 333 rotates. As shown in FIG. 4, turn-on and turn-off positions of the start switch 331 are shown. In the embodiment of this application, the first sensing unit 33 may include a proximity sensor, and a sensing area of the proximity sensor is located in the avoidance groove 13. For example, the proximity sensor is an infrared proximity sensor or a laser radar.

A description is given below in combination with the case where the start switch 331 is arranged. The mobile chassis 202 of the transport robot 200 enters the avoidance groove 13, but when the transport robot 200 has not reached the preset loading or unloading position, the mobile chassis 202 is not in contact with the start switch 331, the start switch 331 is in a turn-off state, and the transport robot 200 does not perform the loading or unloading operation. When the transport robot 200 reaches the preset loading or unloading position, the mobile chassis 202 contacts the start switch 331 and triggers the start switch 331 to act. The start switch 331 is in a turn-on state, and the transport robot 200 performs the loading or unloading operation.

Referring to FIG. 3, a top frame 124 is further connected to the top of the posts 11, and the top frame 124 is connected between four posts 11. In order to better support the storage unit 2, the support 1 further includes an end connector 14. The end connector 14 is connected between two posts 11 arranged in the conveying direction K of the goods, and two opposite ends of the storage unit 2 may be connected between two opposite end connectors 14.

Further, a guide member 141 may be further connected to the end connector 14. The guide member 141 is located at an inner side of the end connector 14, and the guide member 141 extends in the conveying direction K of the goods and is configured to guide the goods when the goods are conveyed from the storage unit 2 or the goods enter the storage unit 2. In a case that the storage unit 2 is fixed to the end connector 14, the guide member 141 is located at an upper position of the bottom of the storage unit 2.

In the embodiment of this application, four posts, that is, two front posts 121 and two rear posts 122, are arranged side by side, and when viewed from the top, the four posts are located at four vertices of the rectangle. The storage unit 2 may be located among the four posts and arranged on the four posts.

When a plurality of storage units 2 are arranged, the storage units 2 are arranged vertically, for example, at intervals in a height direction of the post 11, so that the goods can be stored at different positions in the height direction. It may be understood that since each layer of storage units 2 are stacked at intervals in the height direction, goods may be loaded on each layer of storage units 2, and a loading space 23 for goods to be loaded is formed between each layer of storage units 2 and an adjacent next layer of storage units 2.

It should be noted that an arrangement height of each layer of storage units 2 is in a one-to-one correspondence with an arrangement height of the tray 205 on the transport robot 200, so that the goods on the storage unit 2 can smoothly enter the tray 205. In addition, the arrangement of the storage units 2 in this application is not limited thereto, and a plurality of storage units 2 may be further arranged in a width direction of the support 1. In the embodiment of this application, a length of the storage unit 2 in the conveying direction K of the goods is greater than or equal to a length of the goods in the direction, so that the goods can be completely accommodated in the storage unit 2.

In the embodiment of this application, a plurality of roller conveyors 22 are arranged in each storage unit 2. The plurality of roller conveyors 22 are arranged side by side in the conveying direction of goods, and rotation axes of the plurality of roller conveyors 22 are parallel to each other. In addition, the roller conveyor 22 has an outer contour surface in rolling contact with the goods for driving the goods in and out of the storage unit 2. For example, the roller conveyor 22 is a rotary roller or a conveying belt. When the roller conveyor 22 is a rotary roller, two ends of the rotary roller are rotatably supported by the end connector 14, and a roll surface of the rotary roller can rotate and form the rollable outer contour surface. Moreover, when a plurality of rotary rollers are arranged, rotary shafts of the plurality of rotary rollers are arranged in parallel with each other.

Further, the plurality of roller conveyors 22 may include a driving roller conveyor and a driven roller conveyor. The driving roller conveyor is connected to a first driving device and rotates about an axis of rotation thereof driven by the first driving device. The driven roller conveyor and the driving roller conveyor are linked with each other and rotate driven by the driving roller conveyor. For example, the roller conveyors 22 may be a plurality of linked V-ribbed belt rollers, and the plurality of V-ribbed belt rollers are rotatably connected between two opposite end connectors 14. In addition, adjacent V-ribbed belt rollers are linked through V-ribbed belts, and the V-ribbed belt roller as the driving roller conveyor can drive other V-ribbed belt rollers to rotate together.

In the embodiment of this application, the goods loading or unloading device 100 may further include a lifting mechanism. Each storage unit 2 may be connected to the support 1 through the lifting mechanism, and the lifting mechanism is configured to drive the storage unit 2 to ascend or descend, so that the goods outlet 32 can be at different heights. The lifting mechanism is, for example, a lifting mechanism driven by a cylinder, and the like.

In some embodiments, referring to FIG. 11 described later, the goods loading or unloading device 100 further includes a hoisting mechanism 93. The hoisting mechanism 93 has a bearing platform 931 docked with the goods outlet 32 of the storage unit 2 and/or an outlet on the side opposite to the goods outlet 32, and a lifting module 932 for adjusting a height of the bearing platform 931, so as to convey the goods from the storage unit 2 to and/or back from the external conveying line device. In this way, when a gap exists between the goods outlet 32 or the goods inlet and the external conveying line device, the bearing platform 931 can play an auxiliary bearing role to prevent the goods from being stuck in the gap.

Still referring to FIG. 3, the goods loading or unloading device 100 further includes a feeding or discharging position detection sensor 90. The feeding or discharging position detection sensor 90 is arranged on the support 1, and the feeding or discharging position detection sensor 90 is located at the goods inlet 31 and/or the goods outlet 32 and is configured to detect whether the goods extend to the outside of the storage unit 2. For example, the feeding or discharging position detection sensor 90 may be respectively located in a vertical direction and in an uppermost storage unit and a lowermost storage unit. Optionally, the feeding or discharging position detection sensor may be a reflective photoelectric sensor. For example, when the feeding or discharging position detection sensor 90 detects that goods pass through, it indicates that normal loading or unloading operation is in progress, and the roller conveyor 22 can rotate normally to drive the goods in and out of the storage unit 2.

In the embodiment of this application, in addition to the controller, the control assembly further includes a sensor unit. The sensor unit herein is configured to detect a position of the goods and/or a movement speed of the goods. The first driving device and the sensor unit are both electrically connected to the controller. The controller is configured to control a rotation state of the roller conveyor 22 according to the movement state of the goods, so as to convey goods from the outside of the storage unit 2 into the storage unit 2 and then to the outside of the goods outlet 32 in cooperation with the goods transport mechanism. It should be noted that, the movement state of goods includes at least one of the following: the position of the goods, the movement speed of the goods, and a movement direction of the goods.

In the embodiment of this application, the sensor unit includes at least one of a speed sensor 8 and a position sensor. For example, the sensor unit includes a speed sensor 8 electrically connected to the controller, and the speed sensor 8 is arranged on the storage unit 2. Referring to FIG. 5, two speed sensors 8 are arranged and are respectively arranged at a position of the end connector 14 close to the goods outlet 32 and at a position of the end connector 14 facing away from the goods outlet 32. In addition, for the type of the speed sensor 8, a sensor commonly used in the field may be adopted. For example, the speed sensor 8 is a photoelectric sensor.

In the goods loading or unloading device 100 of this application, the goods can enter and exit one of the storage units 2 in two manners. Goods enter the storage unit 2 through the goods outlet 32, and are conveyed to outside of the storage unit 2 through the goods outlet 32. Alternatively, goods enter the storage unit 2 through the side of the storage unit 2 opposite to the goods outlet 32 and are outputted to the outside of the storage unit 2 through the goods outlet 32. Therefore, the detection of the goods speed should also be discussed depending on situations. The goods inlet 31 and the goods outlet 32 of the storage unit 2 being arranged opposite to each other is used as an example for description.

As one implementation, referring to FIG. 10 described later, goods enter the storage unit 2 through the goods outlet 32, and two speed sensor 8 units include a first speed sensor 81 and a second speed sensor 82. The first speed sensor 81 is located between the second speed sensor 82 and the goods outlet 32. In this case, the movement speed of the goods detected by the first speed sensor 81 is greater than, less than, or equal to the movement speed of the goods detected by the second speed sensor 82, and the controller is configured to control the rotation state of the roller conveyor 22 according to the speed of the goods. It may be understood that the second speed sensor 82 is located on the side of the storage unit 2 opposite to the goods outlet 32. The purpose of such arrangement is to make the speed of goods at the side close to the goods outlet 32 greater than the speed of goods at the side away from the goods outlet 32, or to keep the speed at a stable speed, so that during discharging, the speed of the goods at the goods outlet 32 is greater than the speed of the goods at the side facing away from the goods outlet 32, or to keep the speed at a stable speed value or in an interval, or to increase the movement speed when the goods speed is relatively slow, so as to facilitate the smooth entry of goods into the storage unit 2 by the transport robot 200. During feeding, the speed of the goods at a position facing away from the goods outlet 32 is less than the speed at the goods outlet 32. During the feeding, the speed of the goods is increasingly fast, or is kept at a stable speed value or in an interval, or the movement speed is increased when the speed of the goods is relatively slow, so that the goods can smoothly enter the transport robot 200 from the storage unit 2. The rotation state of the roller conveyor 22 herein includes at least one of the following: the rotation speed of the roller conveyor 22, the rotation direction of the roller conveyor 22, and a start/stop state of the roller conveyor 22.

As another implementation, referring to FIG. 11 described later, goods enter the storage unit 2 through the goods inlet 31, and the sensor unit may include a third speed sensor 83 and a fourth speed sensor 84. The third speed sensor 83 and the fourth speed sensor 84 are spaced apart between the goods inlet 31 and the goods outlet 32 in sequence.

Referring to FIG. 5, in the embodiment of this application, the goods loading or unloading device 100 further includes a first position sensor 91. The first position sensor 91 is arranged on the storage unit 2 and configured to detect a position of goods in the storage unit 2. Specifically, the first position sensor 91 is located at a position of the end connector 14 in each storage unit 2 close to the rear side H. The second driving device described later and the first position sensor 91 are both electrically connected to the controller. The controller is configured to control the rotation state of the roller conveyor 22 according to the position of the goods, so as to convey goods from outside of the storage unit 2 into the storage unit 2 and then to the outside of the goods outlet 32 in cooperation with the goods transport mechanism. In the above solution, the rotation state of the roller conveyor 22 is controlled according to the position of the goods in the storage unit 2. For example, during the feeding, when the goods just start to move, the rear end of the goods in the conveying direction K of the goods is at a larger distance from the goods outlet 32, so that the rotation speed of the roller conveyor 22 can be controlled to be relatively slow. When the goods are about to move out of the storage unit 2, the rear end of the goods in the conveying direction K of the goods is at a smaller distance from the goods outlet 32, and the lifting speed of the roller conveyor 22 can be control, so that the goods can be moved out of the storage unit 2 smoothly.

The structures of the manipulator 5 and the walking frame 6 are described below with reference to FIG. 1. Referring to FIG. 1, as described above, the manipulator 5 can move relative to the storage unit 2, and the manipulator 5 is configured to move to drive the goods to move. That is to say, when the manipulator 5 moves relative to the storage unit 2, the manipulator 5 is configured to convey the goods from the outside of the storage unit 2 into the storage unit 2 and to the outside of the goods outlet 32 through the storage unit 2.

In addition, the manipulator 5 is arranged corresponding to the storage unit 2. For example, each storage unit 2 may be correspondingly provided with two manipulators 5. The two manipulators 5 are symmetrically arranged on two sides of the storage unit 2 in a horizontal direction. However, this application is not limited thereto. Another number of manipulators 5 may be further arranged, and may be further located at other positions. The manipulator 5 may extend in the conveying direction of goods, and in general, the movement direction of the manipulator 5 may be the horizontal direction.

In the embodiment of this application, a movable member 51 is arranged on the manipulator 5, and the movable member 51 is movable relative to the manipulator 5 and arranged on a conveying path of the goods for blocking. The movable member 51 is configured to push the goods when the manipulator 5 moves relative to the storage unit 2.

Specifically, the movable member 51 on the manipulator 5 can move to different positions relative to the manipulator 5. When the movable member 51 is arranged on the conveying path of the goods for blocking, the movable member 51 may push the goods to move. When the movable member 51 is not arranged on the conveying path of the goods for blocking, that is, the movable member 51 is located outside the conveying path of the goods, the movement of the manipulator 5 does not interfere with the goods in this case.

In the embodiment of this application, the movable member 51 may be a movable push rod 52. A first end of the movable push rod 52 is rotatably connected to the manipulator 5, and a second end of the movable push rod 52 is a free end. The second end of the movable push rod 52 is rotatable about a rotary shaft. In addition, when the movable push rod 52 is in an unfolded position, the movable push rod 52 is configured to abut against a side end of the goods and push the goods with the movement of the manipulator 5, so as to convey the goods from the outside of the storage unit 2 into the storage unit 2 and to the outside of the goods outlet 32 when the manipulator 5 moves relative to the support 1.

In other words, the movable push rod 52 is rotatable relative to the manipulator 5, and the rotary shaft of the movable member 51 is parallel to the conveying direction of the goods. The movable member 51 can rotate to the unfolded position or a folded position relative to the manipulator 5. When the movable member 51 is in the unfolded position, that is, the horizontal position, the movable member 51 is arranged on the conveying path of goods (refer to the movable push rod 52 on the right in FIG. 1) for blocking, and the movable member 51 is configured to abut against the goods in the storage unit 2, so as to push the goods when the manipulator 5 moves relative to the support 1. In addition, when the movable member 51 is in the folded position, that is, a vertical position, the movable member 51 is not arranged on the conveying path of the goods (refer to the movable push rod 52 on the left side of the figure in FIG. 1) for blocking, and the movable member 51 will not interact with the goods, that is, will not interfere with the goods.

In the embodiment of this application, the movable member 51 is arranged at one end of the manipulator 5 facing away from the walking frame 6. For example, when the manipulator 5 moves relative to the storage unit 2, a movement range of the end of the manipulator 5 provided with the movable member 51 is from an end of the storage unit 2 facing away from the goods outlet 32 to the goods outlet 32.

Herein, in addition to the movable push rod 52, for example, the movable member 51 may be extended or shortened during rotation, so as to be arranged on the conveying path of the goods for blocking or not to be arranged on the conveying path of the goods for blocking. Further, an even number of movable push rods 52 are arranged and are respectively arranged on two sides of the storage unit 2. In this way, a force may be uniformly applied to the goods.

In the embodiment of this application, the goods loading or unloading device 100 may further include a walking frame 6. Part of the structure of the walking frame 6 is located at a side of the support 1. The manipulator 5 may be connected to the walking frame 6, and the walking frame 6 is movable relative to the support 1 to drive the manipulator 5 to move relative to the storage unit 2.

Referring to FIG. 1, the walking frame 6 may include two support frame bodies 61 respectively arranged on two sides of the support 1 and a connecting beam 62 connected between the two support frame bodies 61, and the manipulator 5 configured to drive the goods to move is arranged on the walking frame 6. For example, the manipulator 5 is mounted on the connecting beam 62, and the manipulator 5 is located at a position corresponding to an upper part of the tray 205 on the transport robot 200. In other words, the manipulator 5 is arranged corresponding to the storage unit 2. Two ends of the connecting beam 62 are respectively connected to the two support frame bodies 61.

In the embodiment of this application, the manipulator 5 and the connecting beam 62 are located inside the support 1, and the supporting frame body 61 is located at the side of the support 1. When the support frame body 61 moves toward the transport robot 200 relative to the support 1, the manipulator 5 is also driven to extend toward the goods.

Figures 6, 7:
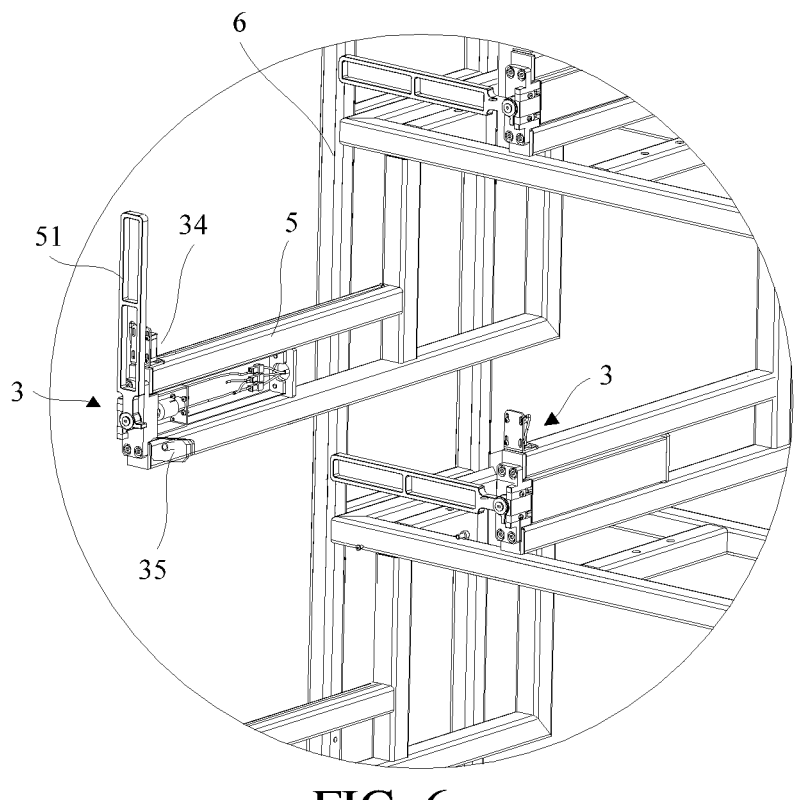
FIG. 6 is a partial enlarged view of a part B in FIG. 1.
FIG. 7 is a schematic exploded view of a local connection structure of a walking frame and a slide rail in a goods loading or unloading device according to Embodiment I of this application.

FIG. 7 is a schematic exploded view of a local connection structure of a walking frame and a slide rail in a goods loading or unloading device according to Embodiment I of this application. Referring to FIG. 7, the fixing of the walking frame 6 such as the support frame body 61 and the support 1, may be realized by, for example, arranging the slide rail 63 on the support 1. In the embodiment of this application, the support 1 includes the slide rail 63. An extending direction of the slide rail 63 is parallel to the conveying direction K of the goods, and the support frame body 61 is arranged on the slide rail 63 and movable relative to the support 1 along the slide rail 63. The slide rail 63 may be mounted to an outer side of the lowermost storage unit.

In addition, the support 1 further includes a slider 64 matching the slide rail 63, and the slider 64 can slide back and forth in the slide rail 63. A connecting plate 611 is arranged at the bottom of the support frame body 61, and the connecting plate 611 is connected to a side of the slider 64 facing away from the slide rail 63, so that the movement of the slider 64 along the slide rail 63 can drive the support frame body 61, that is, the walking frame 6, to move. The slider 64 can move in a straight line along the slide rail 63 driven by the second driving device.

In the embodiment of this application, as described above, the second driving device in the driving assembly is arranged on the support 1, and the second driving device is electrically connected to the controller to drive the manipulator 5 to move relative to the storage unit 2 under the control of the controller.

For example, the second driving device may include a motor, a speed reducer, a driving shaft, a chain wheel, a chain, and the like. An output shaft of the motor is connected to a driving shaft through the speed reducer, the chain wheel is connected to the driving shaft, the chain is tensioned on the chain wheel, and the slider 64 is connected to the chain. In this way, the motor drives the driving shaft to rotate through the speed reducer, and the driving shaft drives the chain wheel to rotate, so that the chain tensioned between the chain wheels generates reciprocating displacement in a straight line and drives the slider 64 to move on the slide rail 63.

Referring to FIG. 7, in order to prevent the walking frame 6 from colliding with the structure on the support 1, resulting in shaking of the support 1, a control assembly of this application is further provided with a second position sensor 92. The second position sensor 92 is electrically connected to the controller. The second position sensor 92 is configured to detect the position of the walking frame 6 relative to the support 1, and the controller is configured to control the movement state of the walking frame 6 relative to the support 1 according to the position detected by the second position sensor 92.

In the above solution, the second position sensor 92 is arranged to detect the position of the walking frame 6 relative to the support 1. When the walking frame 6 moves to the position corresponding to the second position sensor 92, the controller may adjust the movement state of the walking frame 6 in time according to information about the second position sensor 92, for example, control the walking frame 6 to stop moving, that is, the speed of the walking frame 6 relative to the support 1 is zero, so as to avoid collision events and prevent the support frame body 61 of the walking frame 6 from moving outside the support 1. Therefore, the stability and safety of the goods loading or unloading device 100 are relatively high.

In the embodiment of this application, referring to FIG. 7, in order to cooperate with the second position sensor 92, a detector 65 is further arranged on the walking frame 6, and two ends of the detector 65 may respectively extend toward the front post 121 and the rear post 122 on two sides of the walking frame 6. The second position sensor 92 is located at a position corresponding to the detector 65. However, the controller is configured to control the walking frame 6 to stop moving when the walking frame 6 moves to the position where the detector 65 is opposite to the second position sensor 92.

For example, the detector 65 may be arranged on the connecting plate 611 at the bottom of the support frame body 61 and fixed relative to the slider 64. In addition, as an optional manner, the second position sensor 92 is a photoelectric sensor, and the detector 65 includes a light blocking member that may be arranged in front of the position sensor for blocking.

The situation shown in FIG. 7 is used as an example. The support frame body 61 drives the manipulator 5 and the goods to extend toward the goods inlet 31 and drives the detector to move toward the direction close to the second position sensor 92 when moving to the goods inlet 31 on the front side Q. When the detector is located at the side of the second position sensor 92, it is considered that the walking frame 6 has reached a limit position and there is a risk of collision with the front post 121 if the walking frame continues to move to the left. In this case, the controller controls the walking frame 6 to stop moving. When the support frame body 61 moves toward the direction of the goods outlet 32 at the rear side H, the same is true for the case, and the details are not described herein again.

In the embodiment of this application, as described above, in order to further increase the feeding success rate of the goods loading or unloading device 100, it is necessary to monitor the movement state of the movable member 51 relative to the manipulator 5.

Referring to FIG. 1 and FIG. 6, a detection assembly 3 is arranged on at least one manipulator 5. The detection assembly 3 is configured to detect a position state of the movable member 51. At the position, the position state of the movable member 51 includes at least one of the position of the movable member 51 relative to the manipulator 5 and the position of the movable member 51 relative to the goods. As described above, the second driving device is configured to drive the walking frame 6 to move relative to the support 1, and the detection assembly 3 and the second driving unit are both electrically connected to the controller. The controller is configured to control the movement state of the walking frame 6 according to the position state of the movable member 51.

In the embodiment of this application, for a case that a plurality of manipulators 5 are arranged on the goods loading or unloading device 100, at least some movable members 51 of the manipulators 5 may be each correspondingly provided with the detection assembly 3. In other words, as shown in FIG. 1, a detection assembly 3 may be arranged for each of the manipulators 5, or the detection assembly 3 is arranged on some of the manipulators 5.

By arranging the detection assembly 3, the position of the movable member 51 relative to the manipulator 5 and the position of the movable member 51 relative to the goods can be monitored. For example, if the detection assembly 3 detects that the movable member 51 is arranged on the output path of the goods for blocking, a control operation may be performed as required, for example, controlling the movement state of the walking frame 6. Alternatively, if the detection assembly 3 detects that the end of the manipulator 5 has not yet reached the rear side of the goods, the movable member 51 may be controlled to be in the folded position as needed to avoid interference with the goods.

Specifically, the controller may transmit a control instruction to the movable member 51, so that the movable member 51 is changed from not being arranged on the conveying path of goods (corresponding to the folded state of the movable push rod 52) for blocking to being arranged on the conveying path of the goods (corresponding to the unfolded state of the movable push rod 52) for blocking, the feeding operation of the goods loading or unloading device 100 is stopped, or the like, thereby effectively avoiding the failure of the feeding operation and improving the feeding efficiency of the goods loading or unloading device 100. Alternatively, the controller may transmit a control instruction to the movable member 51, so that the movable member 51 continues to maintain the state of being not arranged on the conveying path of the goods for blocking.

Referring to FIG. 1 and FIG. 6, in the embodiments of this application, the detection assembly 3 includes a first position detection sensor 34. In order to better detect the position of the movable member 51, the first position detection sensor 34 is arranged at the end of the manipulator 5, and the first position detection sensor 34 corresponds to the unfolded position or the folded position of the movable push rod 52. In the accompanying drawings of this application, the first position detection sensor 34 corresponding to the folded position of the movable push rod 52 is used as an example for description, but this application is not limited thereto. Alternatively, the first position detection sensor 34 may also correspond to the unfolded position of the movable push rod 52. In FIG. 6, the first position detection sensor 34 is arranged at the end of the manipulator 5, and the movable member can be detected by the first position detection sensor 34 when the movable member 51 is in the folded position, that is, when the movable push rod 52 rotates to the vertical position. In other words, the movable member 51 can be detected by the first position detection sensor 34 when being in a position where the loading or unloading operation cannot be performed. The controller may perform corresponding control according to the detected information. For example, the first position detection sensor 34 is a photoelectric sensor or a contact switch.

In addition, in the embodiment of this application, a plurality of movable members 51 may be arranged. The plurality of movable members 51 are symmetrically arranged on two horizontal sides of the storage unit 2, and each of the movable members 51 is correspondingly provided with one first position detection sensor 34. Corresponding to the situation that two manipulators 5 are provided in FIG. 1 and FIG. 6, one movable member 51 is arranged on each of the manipulators 5, and an end of each manipulator 5 is provided with one first position detection sensor 34.

In the state shown in FIG. 6, if the end of the manipulator 5 on the left side of the figure and the end of the manipulator 5 on the right side of the figure are both provided with the first position detection sensor 34, and the movable member 51 on the left side is in the folded state, the first position detection sensor 34 located on the left side transmits the detected information that the movable member 51 is in the folded state to the controller. The movable member 51 on the right side is in the unfolded state, and the first position detection sensor 34 on the right side transmits the information that the movable member 51 on the right side is in the unfolded state to the controller.

It should be noted that the movable member 51 mentioned in this application being in the unfolded state means that the movable push rod 52 is in a horizontal state. The movable member 51 being in the folded state means that the movable push rod 52 is vertical, and the goods cannot be loaded/unloaded.

It should be understood that in the above control process, the movable push rod 52 can be detected by the first position detection sensor 34 when being in the folded state, and the detected information that the movable push rod is in the folded state is transmitted to the controller. The controller controls the movement state of the walking frame 6 as required. However, when the movable push rod 52 is in the unfolded state, for example, when the movable push rod 52 is horizontal or rotates to the position between folding and unfolding, it is considered that the movable push rod 52 can still perform the feeding operation. Therefore, the controller will not adjust the movement state of the walking frame 6.

In the embodiment of this application, in order to prevent the movable member 51 from interfering with the goods before reaching the rear side of the goods, the position of the end of the manipulator 5 relative to the goods needs to be detected. Referring to FIG. 6, the detection assembly 3 may further include a second position detection sensor 35. The second position detection sensor 35 is arranged on the manipulator 5, and a position of the second position detection sensor 35 corresponds to the position of the movable member 51. The second position detection sensor 35 is configured to detect whether the movable member 51 is located outside the end of the goods.

It should be noted that, the second position detection sensor 35 and the movable member 51 are located at the same position of the manipulator 5 in the conveying direction of goods. For example, the second position detection sensor 35 may be located at the end of the manipulator 5 and at the side of the manipulator 5 close to the goods, so as to detect the position of the movable member 51 at the end of the manipulator 5 relative to the goods. It may be understood that the second position detection sensor 35 may also be located at the bottom or top of the manipulator 5, as long as it can be detected whether the movable member 51 at the end of the manipulator 5 is located at the rear side of the goods. Similar to the first position detection sensor 34, the second position detection sensor 35 is also a photoelectric sensor or a contact switch.

Figure 8:
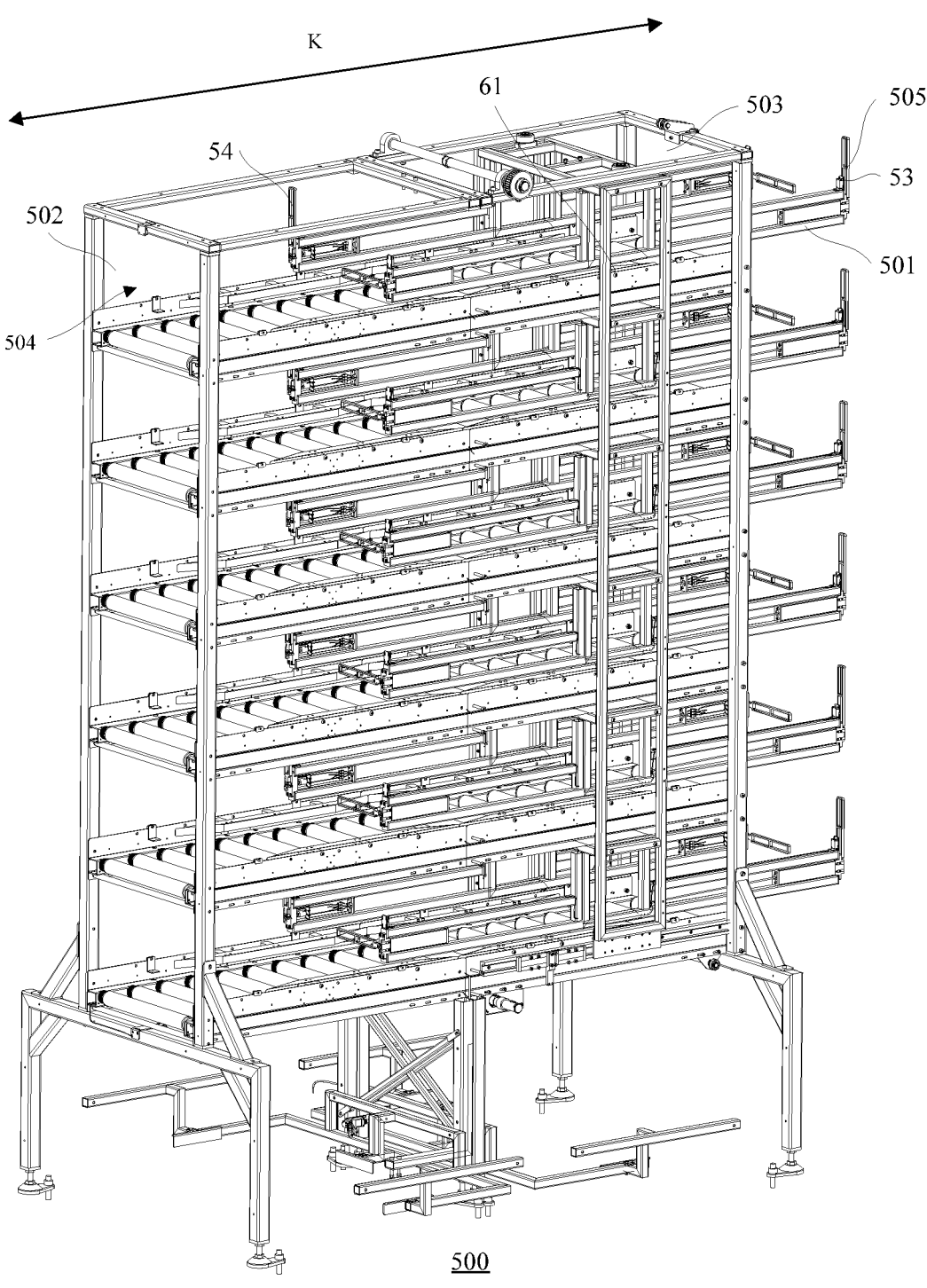
FIG. 8 is a schematic diagram of another structure of a goods loading or unloading device according to Embodiment I of this application.
Figure 9:
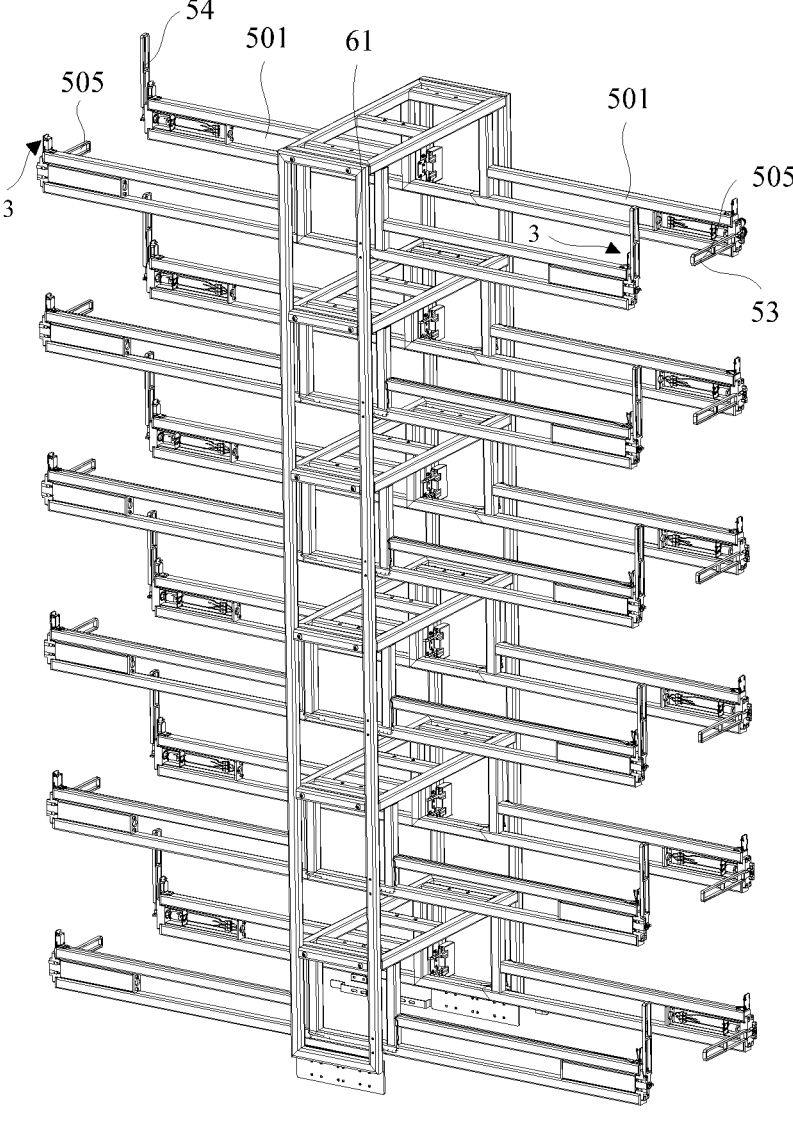
FIG. 9 is a schematic structural diagram of a walking frame and a manipulator in another structure of a goods loading or unloading device according to Embodiment I of this application.

FIG. 8 is a schematic diagram of another structure of a goods loading or unloading device according to Embodiment I of this application. FIG. 9 is a schematic structural diagram of a walking frame and a manipulator in another structure of a goods loading or unloading device according to Embodiment I of this application. For a goods loading or unloading device 500 shown in FIG. 8 and FIG. 9, structures such as a manipulator, a movable member, and a detection assembly are improved based on the goods loading or unloading device 100 shown in FIG. 1, and the rest is the same as the goods loading or unloading device 100 shown in FIG. 1. Only the improved part is described in detail below, and the rest has been described in detail above. Therefore, the details are not described herein again.

In the embodiment of this application, a plurality of movable members may also be arranged, that is, a movable member 505 may be arranged on the walking frame in each of two directions of the conveying direction K of the goods. Referring to FIG. 8 and FIG. 9, different from the structure shown in FIG. 1, the manipulator 501 is relatively long, and the support frame body 61 is connected to a middle position of the manipulator 501, so that the manipulator 501 has two ends facing the goods outlet 503 and the goods inlet 502, which are respectively a first end and a second end. The movable member 505 is correspondingly connected to each of the two ends of the manipulator 501.

Specifically, the plurality of movable members 505 may include a first movable member 53 and a second movable member 54. The first movable member 53 and the second movable member 54 are respectively arranged at two opposite ends of the same manipulator 501 in the extending direction, that is, respectively arranged at a first end and a second end of a manipulator. The first movable member 53 is arranged at the second end of the manipulator 501, and is configured to push goods from outside of the storage unit 504 into the storage unit 504 when the manipulator 501 moves relative to the storage unit 504. The second movable member 54 is arranged at the first end of the manipulator 501, and is configured to push the goods from inside of the storage unit 504 to outside of the goods outlet 503 when the manipulator 501 moves relative to the storage unit 504.

At least one of the first movable member 53 and the second movable member 54 is correspondingly provided with the detection assembly 3. For example, the first movable member 53 and the second movable member 54 are each correspondingly provided with the detection assembly 3. In the above goods loading or unloading device 500, goods enter the storage unit 504 through the goods outlet 503, and one end of the manipulator 501 may extend from the outside of the goods outlet 503. The end of the manipulator 501 that can extend to the outside of the goods outlet 503 is provided with the first movable member 53.

It should be noted that, when the first movable member 53 is in the unfolded position, the second movable member 54 is in the unfolded position or the folded position. Specifically, alternatively, the first movable member 53 pushes the goods outside the storage unit into the storage unit, the second movable member 54 is located at the other end of the manipulator 501, and the state of the second movable member does not affect the first movable member 53. When the second movable member 54 is in the unfolded position, the first movable member 53 is in the folded position. Specifically, alternatively, the second movable member 54 pushes the goods in the storage unit 504 out of the storage unit 504, and in this case, the first movable member 53 is in the folded position, so as not to affect the output operation of the goods.

As another possible manner, goods enter the storage unit 504 through a side of the storage unit 504 opposite to the goods outlet 503, and the storage unit 504 has a goods inlet 502 opposite to the goods outlet 503. In this case, the movable member 505 may be arranged at the end of the manipulator 501, and a movement range of the end of the manipulator 501 provided with the movable member 505 is from outside of the goods inlet 502 to the goods outlet 503. It may be understood that the movable member 505 may be arranged at one end of the manipulator 501 or at two ends of the manipulator 501 as shown in FIG. 8.

Moreover, a movement stroke of the manipulator 501 in the conveying direction K of the goods is greater than or equal to a length of the storage unit 504 in the direction. The movable member 505 is configured to push the goods from the outside of the goods inlet 502 to the outside of the goods outlet 503 through the storage unit 504 when the manipulator 501 moves relative to the storage unit 504.

In the embodiment of this application, the movement range of the movable member 505 relative to the storage unit 504 is from the outside of the goods inlet 502 to the goods outlet 503. In addition, when the movable member 505 is located outside the goods inlet 502, a distance between the movable member 505 and the goods inlet 502 is greater than or equal to a length of the goods in the conveying direction K of the goods.

It may be understood that in a case that the movable member 505 includes the first movable member 53 and the second movable member 54, a manner in which the first movable member 53 and the second movable member 54 are each connected to the manipulator 501 is similar to that of the movable member 51 in the goods loading or unloading device 100 of FIG. 1. For example, the movable member 505 may also be a movable push rod, and a first end of the movable push rod is connected to the manipulator 501. A second end of the movable push rod can rotate about the axis of rotation. When the movable push rod is in the unfolded position, the movable push rod may abut against a side end of the goods and push the goods with the movement of the manipulator 501. A rotary shaft of each of the first movable member 53 and the second movable member 54 is parallel to the conveying direction of goods, and the like.

Next, several processes of performing goods loading or unloading by using the goods loading or unloading devices 100 and 500 of this application are described. For example, the goods loading or unloading device 100 is used as an example for description, which is similar to the loading or unloading manner of the goods loading or unloading device 500, and the details are not described herein again. In this application, it should be noted that, no matter from which port of the storage unit the goods enter the storage unit, the goods are all conveyed to the outside of the storage unit from the goods outlet.

In the above solution, for one storage unit, according to different ports through which goods enter, goods may enter through the goods outlet 32 or enter through the side opposite to the goods outlet 32. It may be understood that one storage unit 2 herein may be any storage unit 2 in the goods loading or unloading device 100. The possible loading or unloading solution in the one storage unit 2 is described respectively for two cases below.

Figures 10, 11:
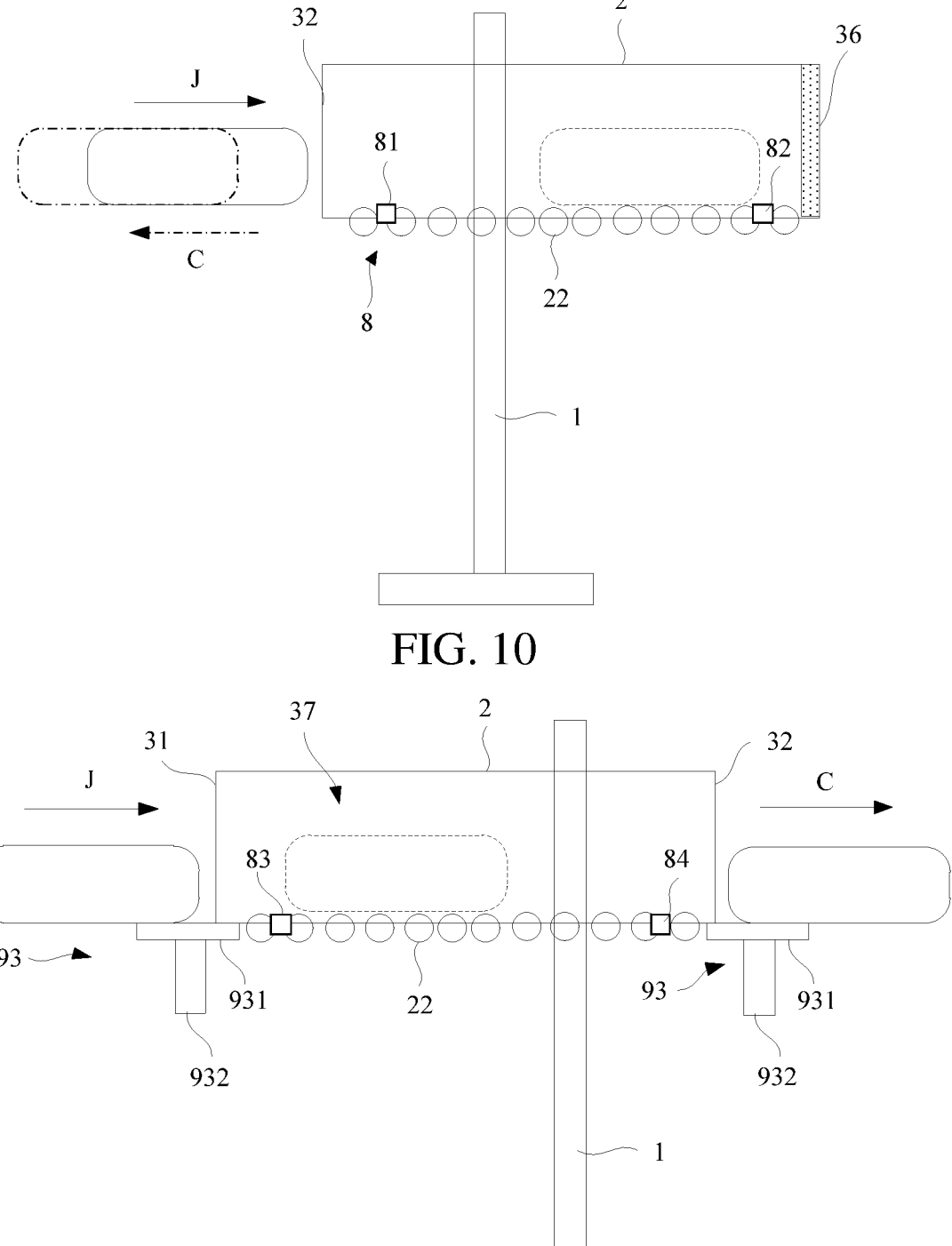
FIG. 10 is a schematic diagram of a goods loading or unloading manner of a storage unit in a goods loading or unloading device according to Embodiment I of this application.
FIG. 11 is a schematic diagram of another goods loading or unloading manner of a storage unit in a goods loading or unloading device according to Embodiment I of this application.

FIG. 10 is a schematic diagram of a goods loading or unloading manner of a storage unit in a goods loading or unloading device according to Embodiment I of this application. FIG. 11 is a schematic diagram of another goods loading or unloading manner of a storage unit in a goods loading or unloading device according to Embodiment I of this application. It should be noted that, in these accompanying drawings, goods in the storage unit 2 are indicated by dashed lines, and goods before entering the storage unit 2 are indicated by solid lines. A solid arrow indicates a direction in which the goods enter the storage unit 2. Dash-dot lines are used to indicate that the goods are conveyed from the storage unit 2. A dash-dot line arrow indicates a direction in which the goods are conveyed from the storage unit 2. The reference numeral "J" indicates that the goods enter the storage unit, and the reference numeral "C" indicates that the goods are conveyed from the storage unit.

First, the case that the goods enter from a goods outlet 32 is described. As shown in FIG. 10, the goods may enter the storage unit 2 through the goods outlet 32 of the storage unit

2, and the goods are conveyed to the outside of the storage unit 2 through the goods outlet 32 of the same storage unit 2. A roller conveyor 22 is rotatable bidirectionally about an axis of rotation thereof. However, goods entering the storage unit 2 through the goods outlet 32 and being outputted through the goods outlet 32 specifically means that the goods are conveyed into the storage unit 2 through the goods outlet 32 when the roller conveyor 22 rotates away from the goods outlet 32. For goods output, when the roller conveyor 22 rotates toward the goods outlet 32, the goods are conveyed to the outside of the goods outlet 32 through the storage unit 2.

Certainly, an end of the storage unit 2 opposite to the goods outlet 32 may be a closed end for the above goods loading or unloading manner. Alternatively, the end of the storage unit 2 opposite to the goods outlet 32 may be also provided with a stop structure 36. The stop structure 36 is configured to abut against goods. This can prevent the goods from falling from the side opposite to the goods outlet 32.

Second, the case that the goods enter from the side opposite to the goods outlet 32 is described. As shown in FIG. 11, the goods may enter the storage unit 2 from the side of the storage unit 2 opposite to the goods outlet 32, and the goods are conveyed to the outside of the storage unit 2 through the goods outlet 32 of the storage unit 2. The roller conveyor 22 is rotatable unidirectionally about the axis of rotation thereof. However, the goods entering the storage unit 2 from the side opposite to the goods outlet 32 and being outputted through the goods outlet 32 specifically means that the goods are conveyed into the storage unit 2 through the side opposite to the goods outlet 32 when the roller conveyor 22 rotates toward the goods outlet 32. For goods output, the roller conveyor 22 still rotates toward the goods outlet 32, and the goods are conveyed to the outside of the goods outlet 32 through the storage unit 2.

Certainly, for the above goods loading or unloading manner, both ends of the storage unit 2 need to be open. As described above, the storage unit 2 has a goods inlet 31 opposite to the goods outlet 32, so that the goods can enter the storage unit 2 from the goods inlet 31. A goods conveying channel 37 extending through the storage unit 2 may be formed between the goods inlet 31 and the goods outlet 32, and the roller conveyor 22 is correspondingly arranged in the goods conveying channel 37. Herein, the goods inlet 31 may form the above opening on the side opposite to the goods outlet 32.

In the embodiment of this application, one or more storage units 2 may be arranged in one goods loading or unloading device 100, and a plurality of storage units 2 may be arranged in a vertical direction. For the case that one goods loading or unloading device 100 includes one storage unit 2, reference may be made to the examples of FIG. 10 and FIG. 11. However, for the case that one goods loading or unloading device 100 includes a plurality of storage units 2, each of the storage units 2 may have the above two possibilities as described in FIG. 10 or FIG. 11. It should be noted that, for the plurality of storage units 2 in the goods loading or unloading device 100, various possible arrangements and combinations are included in the scope of this application.

Figure 12:
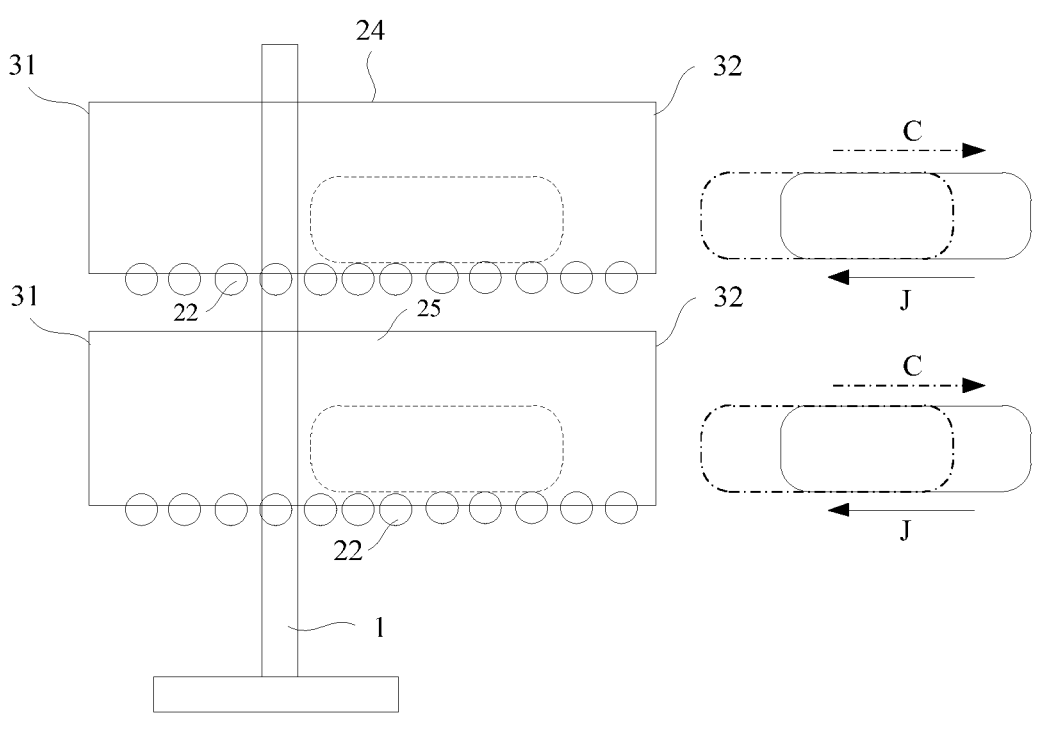
FIG. 12 is a schematic diagram of a first goods loading or unloading manner of a goods loading or unloading device according to Embodiment I of this application.
Figure 13:
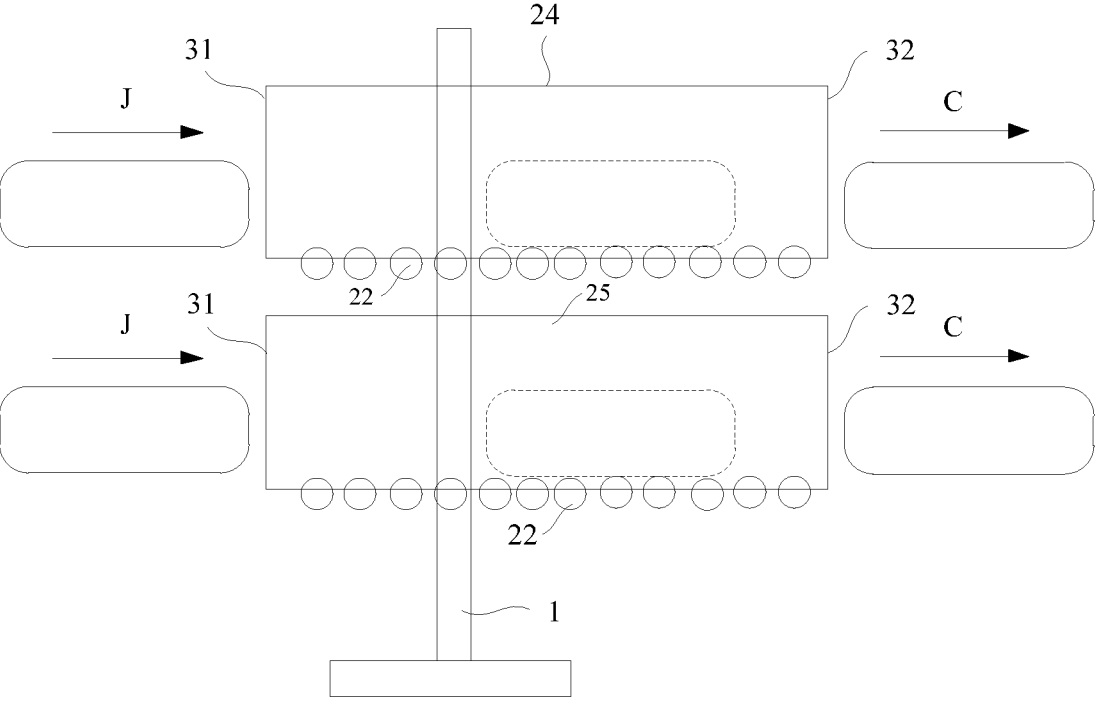
FIG. 13 is a schematic diagram of a second goods loading or unloading manner of a goods loading or unloading device according to Embodiment I of this application.
Figures 14A, 14B:
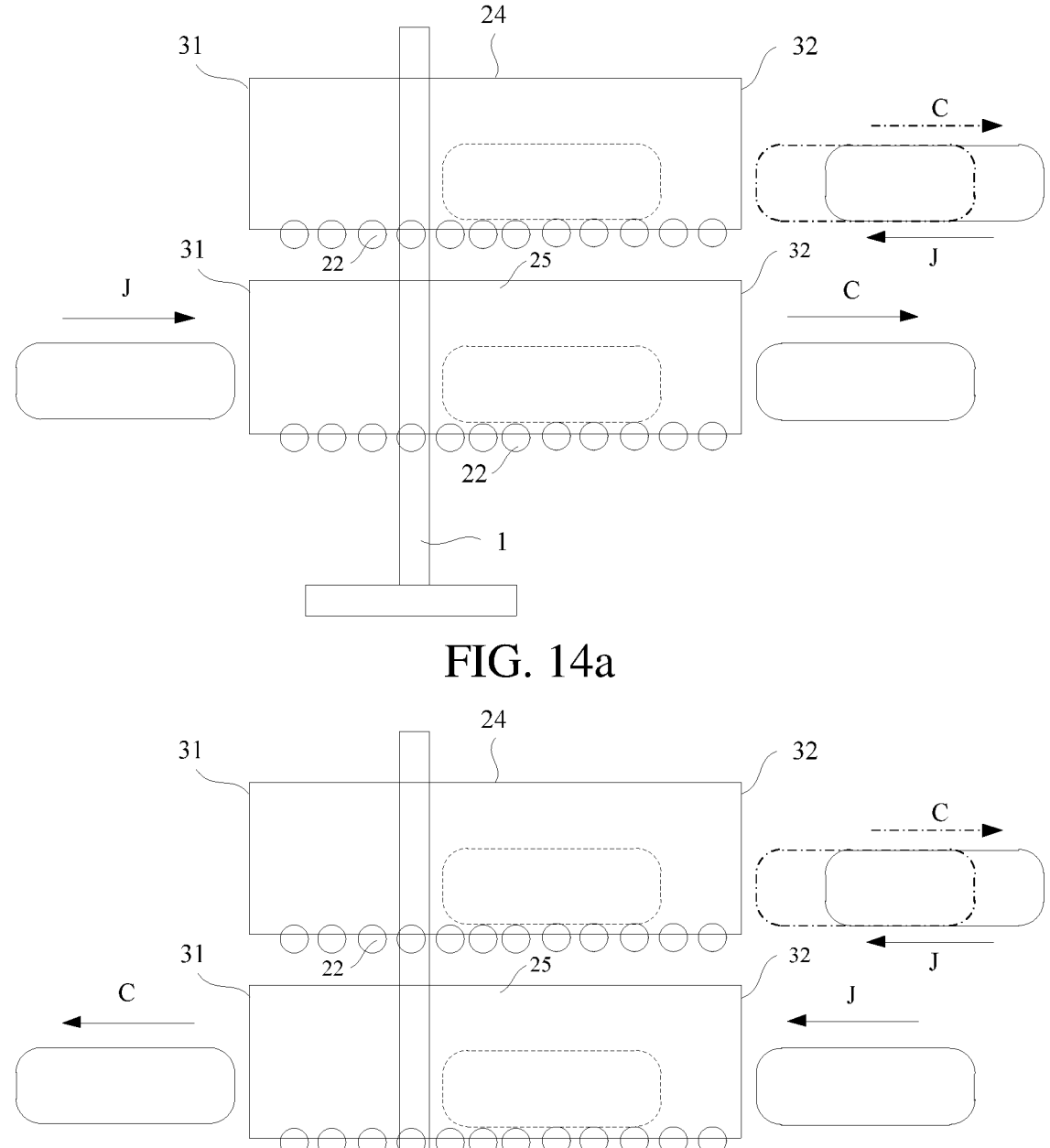
FIG. 14*a* is a schematic diagram of a third goods loading or unloading manner of a goods loading or unloading device according to Embodiment I of this application.
FIG. 14*b* is a schematic diagram of a fourth goods loading or unloading manner of a goods loading or unloading device according to Embodiment I of this application.
Figures 15, 16, 17:
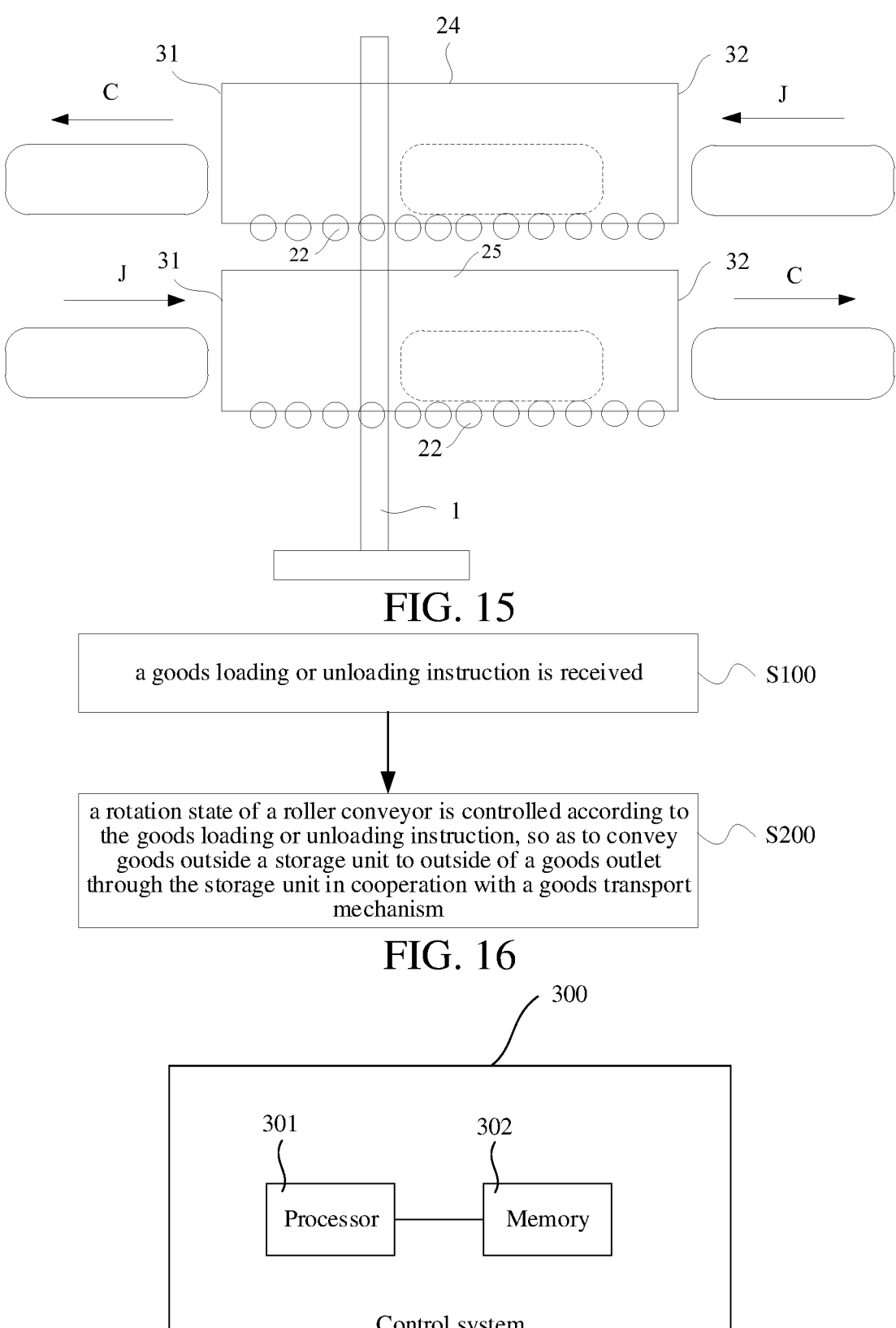
FIG. 15 is schematic diagram of a fifth goods loading or unloading manner of a goods loading or unloading device according to Embodiment I of this application.
FIG. 16 is a flowchart of a goods loading or unloading control method according to Embodiment III of this application.
FIG. 17 is a structural block diagram of a control device according to Embodiment IV of this application.

FIG. 12 is a schematic diagram of a first goods loading or unloading manner of a goods loading or unloading device according to Embodiment I of this application. FIG. 13 is a schematic diagram of a second goods loading or unloading manner of a goods loading or unloading device according to Embodiment I of this application. FIG. 14a is a schematic diagram of a third goods loading or unloading manner of a goods loading or unloading device according to Embodiment I of this application. FIG. 14b is a schematic diagram of a fourth goods loading or unloading manner of a goods loading or unloading device according to Embodiment I of this application. FIG. 15 is a schematic diagram of a fifth goods loading or unloading manner of a goods loading or unloading device according to Embodiment I of this application.

In the embodiment of this application, in a case that the goods loading or unloading device 100 includes a plurality of storage units, the loading or unloading solution of two of the storage units arranged on a support 1 is used as an example for description. The loading or unloading solution of another number of storage units that are arranged may be obtained through arrangement and combination by analogy according to the solutions of FIG. 10 to FIG. 15, and the details are not described herein again. It should be noted that, in FIG. 12 to FIG. 15, only two of the storage units are shown by way of example, which is similar to the case that the goods loading or unloading device 100 includes another number of storage units, and the details are not described herein again.

Specifically, the plurality of storage units 2 include at least one first storage unit 24 and at least one second storage unit 25. The first storage unit 24 may be located above the second storage unit 25. Several cases are listed below for description.

Referring to FIG. 12, goods corresponding to the first storage unit 24 enter the first storage unit 24 through a goods outlet 32, and are conveyed to outside of the first storage unit 24 through the goods outlet 32. Goods corresponding to the second storage unit 25 enter the second storage unit 25 through the goods outlet 32, and are conveyed to outside of the second storage unit 25 through the goods outlet 32. In practical application, the goods outlet 32 of each storage unit 2 may be used in cooperation with a transport robot 200 to unload the goods on the transport robot 200 into the storage unit 2 of the goods loading or unloading device 100, so as to realize discharging of the transport robot 200. Then the goods in the storage unit 2 of the goods loading or unloading device 100 are conveyed into another transport robot 200 or a production line, so as to realize feeding of the other transport robot 200 or production line. It may be understood that when the goods loading or unloading device 100 includes another number of storage units 2, goods in all storage units 2 may enter the storage units 2 through the goods outlet 32 and be outputted from the storage units 2 through the goods outlet 32.

Referring to FIG. 13, goods corresponding to the first storage unit 24 enter the first storage unit 24 from a side (for example, a goods inlet 31) of the first storage unit 24 opposite to the goods outlet 32, and are conveyed to outside of the first storage unit 24 through the goods outlet 32. Goods corresponding to the second storage unit 25 enter the second storage unit 25 from a side (for example, the goods inlet 31) of the second storage unit 25 opposite to the goods outlet 32, and are conveyed to outside of the second storage unit 25 through the goods outlet 32. In practical application, the goods inlet 31 of each storage unit 2 may be used in cooperation with the transport robot 200 to unload the goods on the transport robot 200 into the storage unit 2 of the goods loading or unloading device 100, so as to realize discharging of the transport robot 200. The goods in the storage unit 2 of the goods loading or unloading device 100 are conveyed into another transport robot 200 or production line, so as to realize the feeding of the other transport robot 200 or production line. It may be understood that when the goods loading or unloading device 100 includes another number of storage units 2, goods in all storage units 2 may enter the storage units 2 through the goods inlet 31 and be outputted from the storage units 2 through the goods outlet 32.

Referring to FIG. 14a, goods corresponding to the first storage unit 24 enter the first storage unit 24 through the goods outlet 32 of the first storage unit 24, and are conveyed to outside of the first storage unit 24 through the goods outlet 32. Goods corresponding to the second storage unit 25 enter the second storage unit 25 from a side (the goods inlet 31) opposite to the goods outlet 32, and are conveyed to outside of the second storage unit 25 through the goods outlet 32 of the second storage unit 25. In practical application, the goods outlet 32 of the first storage unit 24 may be used in cooperation with the transport robot 200 to unload the goods on the transport robot 200 into the first storage unit 24 of the goods loading or unloading device 100, so as to realize discharging of the transport robot 200. The goods in the first storage unit 24 of the goods loading or unloading device 100 are conveyed into another transport robot located at the goods outlet 32. The goods inlet 31 of the second storage unit 25 is used in cooperation with the transport robot 200 to unload the goods on the transport robot 200 into the second storage unit 25 of the goods loading or unloading device 100, so as to realize discharging of the transport robot 200. The goods in the second storage unit 25 are conveyed to the production line at the goods outlet 32, so as to realize feeding of the transport robot 200 and the production line in different directions.

Referring to FIG. 14b, goods corresponding to the first storage unit 24 enter the first storage unit 24 through the goods outlet 32 of the first storage unit 24, and are conveyed to outside of the first storage unit 24 through the goods outlet 32. Goods corresponding to the second storage unit 25 enter the second storage unit 25 through the goods outlet 32 of the second storage unit 25, and are conveyed to the outside of the second storage unit 25 through the side opposite to the goods outlet 32 (the goods inlet 31). In practical application, the goods outlet 32 of the first storage unit 24 may be used in cooperation with the transport robot 200 to unload the goods on the transport robot 200 into the first storage unit 24 of the goods loading or unloading device 100, so as to realize discharging of the transport robot 200. The goods in the first storage unit 24 of the goods loading or unloading device 100 are conveyed into another transport robot located at the goods outlet 32. The goods outlet 32 of the second storage unit 25 is used in cooperation with the transport robot 200 to unload the goods on the transport robot 200 into the second storage unit 25 of the goods loading or unloading device 100, so as to realize discharging of the transport robot 200. The goods in the second storage unit 25 are conveyed to the production line at the goods inlet 31, so as to realize feeding of the transport robot 200 and the production line in different directions. Referring to FIG. 15, goods corresponding to the first storage unit 24 enter the first storage unit 24 through the goods outlet 32 of the first storage unit 24, and are conveyed to outside of the first storage unit 24 through the goods inlet 31. Goods corresponding to the second storage unit 25 enter the second storage unit 25 from a side (the goods inlet 31) of the second storage unit 25 opposite to the goods outlet 32, and are conveyed to outside of the second storage unit 25 through the goods outlet 32 of the second storage unit 25. In practical application, the goods outlet 32 of the first storage unit 24 may be used in cooperation with the transport robot 200 to unload the goods on the transport robot 200 into the first storage unit 24 of the goods loading or unloading device 100, so as to realize discharging of the transport robot 200. The goods in the first storage unit 24 of the goods loading or unloading device 100 are conveyed into another transport robot 200, so as to realize the feeding of the other transport robot 200. In addition, the goods inlet 31 of the second storage unit 25 is used in cooperation with yet another transport robot 200 to unload the goods on the yet another transport robot 200 into the second storage unit 25 of the goods loading or unloading device 100, so as to realize discharging of the yet another transport robot 200. The goods in the second storage unit 25 of the goods loading or unloading device 100 are conveyed to the production line, so as to realize feeding of the production line. In this way, the two storage units can operate independently, that is, the feeding and discharging of the two storage units are independent and time-sharing, and do not affect each other.

It may be understood that in the solution shown in FIG. 15 above, in fact, the roller conveyors 22 corresponding to the storage units rotate independently of each other, so that the storage units can convey corresponding goods independently, and rotation directions of the roller conveyors 22 corresponding to the storage units are the same or different.

Embodiment II

This embodiment provides a warehousing system, including the transport robot 200 and the goods loading or unloading devices 100 and 500 of Embodiment I. As previously described, the transport robot 200 is provided with trays 205. The trays 205 are arranged corresponding to storage units 2 and 504 of the goods loading or unloading devices 100 and 500 to perform goods loading or unloading operations through the goods loading or unloading devices 100 and 500. The trays 205 are arranged corresponding to the storage units 2 and 504 of the goods loading or unloading device 100, which specifically means that the tray 205 and the bottom of each of the storage units 2 and 504 are arranged at a substantially same height, at corresponding positions, and opposite to each other.

It should be noted that, the specific structure and functions of the transport robot 200 have been described in Embodiment I, and the specific structures and functions of the goods loading or unloading devices 100 and 500 have also been described in detail in Embodiment I. The details are not described herein again. It should be noted that the transport robot 200 of this application is not limited to the transport robot 200 described in Embodiment I, as long as a tray 205 configured for goods to be loaded is provided, and the tray 205 is arranged corresponding to the storage unit 2 of the goods loading or unloading device 100.

Embodiment III

This embodiment provides a goods loading or unloading control method. The goods loading or unloading control method of this embodiment may be applied to the goods loading or unloading devices 100 and 500 described in Embodiment I, and may also be applied to the warehousing system provided in Embodiment II.

FIG. 16 is a flowchart of a goods loading or unloading control method according to Embodiment III of this application. Referring to FIG. 16, the method includes the following operations.

In block S100: a goods loading or unloading instruction is received.

In block S200: a rotation state of a roller conveyor is controlled according to the goods loading or unloading instruction, so as to convey goods outside a storage unit 2 to outside of a goods outlet through the storage unit in cooperation with a goods transport mechanism.

In the above solution, the goods loading or unloading device is used for automatic feeding or discharging, and the rotation of the roller conveyor can generate a traction force for the goods. Therefore, by controlling the rotation state of the roller conveyor 22, the goods may be conveyed from the outside of the storage unit into the storage unit for automatic discharging, and the goods in the storage unit are conveyed to the outside of the goods outlet 32 for automatic feeding. In the process, manual loading or unloading of goods is not required, and therefore the degree of automation is relatively high and the operation efficiency is relatively high.

The goods outside the storage unit being conveyed to the outside of the goods outlet 32 through the storage unit in cooperation with the goods transport mechanism means conveying the goods outside the storage unit into the storage unit and conveying the goods inside the storage unit to the outside of the storage unit through the goods outlet 32.

In actual control, the controlling a rotation state of the roller conveyor 22 according to the goods loading or unloading control instruction, so as to cooperate with a goods transport mechanism to convey goods outside the storage unit from inside of the storage unit to outside of the goods outlet 32 includes: controlling the roller conveyor 22 to rotate toward the goods outlet 32 according to the goods loading or unloading control instruction, so as to convey the goods from the storage unit to the outside of the goods outlet 32.

Specifically, feeding of the transport robot 200 is used as an example for description. The transport robot 200 approaches the goods loading or unloading device and reaches a preset feeding position. The roller conveyor 22 may be controlled to rotate toward the goods outlet 32, and a traction force toward the goods outlet 32 is generated for the goods. In this case, the goods move into the tray 205 of the transport robot 200 under the action of the traction force, so as to realize the feeding operation.

In the embodiment of this application, before the controlling the roller conveyor 22 to rotate toward the goods outlet 32 according to the goods loading or unloading control instruction, so as to convey the goods from the storage unit 2 to the outside of the goods outlet 32, the method further includes: controlling the roller conveyor 22 to rotate away from the goods outlet 32 to convey the goods into the storage unit through the goods outlet 32.

Specifically, discharging of the transport robot is used as an example for description. The transport robot 200 approaches the goods loading or unloading device and reaches a preset discharging position. The roller conveyor 22 may be controlled to rotate away from the goods outlet 32, and a traction force facing away from a side of the goods outlet 32 is generated for the goods. In this case, the goods move from the tray 205 of the transport robot 200 to the goods outlet 32 and enter the storage unit 2 under the action of the traction force, so as to realize the discharging of the transport robot 200.

In some other examples, the controlling a rotation state of a roller conveyor according to the goods loading or unloading instruction, so as to convey goods outside a storage unit 2 to outside of a goods outlet 32 through the storage unit 2 in cooperation with a goods transport mechanism includes:

controlling a rotation state of the roller conveyor 22 according to at least one of a position of the goods in the storage unit and a movement speed of the goods, so as to convey goods outside the storage unit to outside of the goods outlet 32 through the storage unit in cooperation with a goods transport mechanism.

In the above solution, the rotation state of the roller conveyor 22 is controlled according to the position of the goods in the storage unit. For example, the feeding of the transport robot is used as an example for description. When the goods just start to move, a distance between the rear end of the goods and the goods outlet 32 is relatively long, and the roller conveyor 22 can be controlled to rotate relatively slow. When the goods are about to move out of the storage unit, the distance between the rear end of the goods and the goods outlet 32 is close to zero, and the roller conveyor 22 can be controlled to rotate relatively fast, so that the goods can move out of the storage unit and smoothly enter the tray 205 of the transport robot 200. The position of the goods in the storage unit herein may be detected according to the first position sensor 91 described in Embodiment I.

The rolling state of the roller conveyor 22 is controlled according to the movement speed of the goods. For example, the movement speed of the goods may be controlled within a suitable range, so as to avoid a case that the goods cannot be completely moved out of the storage unit or are being moved out of the storage unit excessively fast. It is to be understood that the rotation state of the roller conveyor 22 may be controlled according to the position of the goods in the storage unit. Alternatively, the rotation state of the roller conveyor 22 is controlled according to the movement speed of the goods. Alternatively, the rotation state of the roller conveyor 22 is controlled according to both the position of the goods in the storage unit and the movement speed of the goods.

In the embodiment of this application, the controlling a rotation state of the roller conveyor 22 according to at least one of a position of the goods in the storage unit and a movement speed of the goods further includes: detecting the movement speed of the goods.

The detecting the movement speed of the goods includes: detecting the movement speed of goods in at least two different positions in the storage unit. For example, as described in Embodiment I, in a case that goods enter the storage unit 2 through the goods outlet 32, a speed sensor 8 may include a first speed sensor 81 and a second speed sensor 82. The second speed sensor 82 may be located on a side of the storage unit 2 away from the goods outlet 32, and the first speed sensor 81 may be located between the second speed sensor 82 and the goods outlet 32. During the movement of the goods toward the goods outlet 32, the first speed sensor 81 may measure the speed of goods close to the goods outlet 32, and the second speed sensor 82 may measure the speed of goods at a preset position on a side away from the goods outlet 32.

In addition, as described above, a driving roller conveyor and a driven roller conveyor included in the roller conveyor 22 may be connected by a belt, or the like. In this way, the controlling a rotation state of a roller conveyor according to the goods loading or unloading instruction, so as to convey goods outside a storage unit to outside of a goods outlet 32 through the storage unit in cooperation with a goods transport mechanism includes: controlling a rotation state of the driving roller conveyor, so that the driving roller conveyor and the driven roller conveyor can jointly convey goods.

In some other examples, as described above, the goods transport mechanism is located in the goods loading or unloading device. The goods transport mechanism includes a manipulator that is movable relative to the storage unit. The manipulator is configured to move to drive the goods to move. That is, a movable member of the manipulator also provides power for conveying the goods. In this case, the goods loading or unloading control method further includes:

controlling a movement state of the manipulator so that the manipulator and the roller conveyor 22 jointly convey the goods outside the storage unit to the outside of the goods outlet 32 through the storage unit.

Specifically, the controlling a movement state of the manipulator may include: controlling a movement speed of the manipulator and/or a position of the manipulator relative to the storage unit. Similar to the influence of the rotation speed of the roller conveyor 22 on the movement speed of goods, the movement speed of the manipulator directly and positively affects the movement speed of goods. However, the position of the manipulator relative to the storage unit may also affect the position of the goods relative to the storage unit.

In addition, as described above, the movable member can rotate to different positions relative to the manipulator to be unfolded or folded. When the movable member is in the unfolded state, the manipulator may drive the goods to move. Therefore, before the controlling a movement state of the manipulator so that the manipulator and the roller conveyor 22 jointly convey the goods outside the storage unit to the outside of the goods outlet 32 through the storage unit, the method further includes:

changing positions of at least some movable members relative to the manipulators, so that the movable members are arranged at a side of the goods in a conveying direction for blocking.

In the embodiment of this application, as described above, a plurality of storage units are arranged, and the plurality of storage units are arranged in a vertical direction. Since each storage unit has two situations: goods enter the storage unit through the goods outlet 32 and goods enter the storage unit through a side away from the goods outlet 32. Therefore, in a case that the plurality of storage units are arranged, the storage units in the same goods loading or unloading device may have different control methods.

For example, the controlling a rotation state of a roller conveyor according to the goods loading or unloading instruction, so as to convey goods outside a storage unit to outside of a goods outlet 32 through the storage unit in cooperation with a goods transport mechanism specifically further includes:

controlling the rotation state of the roller conveyor, so as to convey all goods corresponding to the storage unit into the storage unit through the goods outlet 32 or through a side of the storage unit opposite to the goods outlet 32 in cooperation with the goods transport mechanism.

In some other examples, the plurality of storage units include at least one first storage unit and at least one second storage unit. However, the controlling a rotation state of a roller conveyor according to the goods loading or unloading instruction, so as to convey goods outside a storage unit to outside of a goods outlet 32 through the storage unit in cooperation with a goods transport mechanism includes:

controlling the rotation state of the roller conveyor, so as to convey goods corresponding to the first storage unit into the first storage unit through the goods outlet and to the outside of the first storage unit through the goods outlet and to convey goods corresponding to the second storage unit into the second storage unit through a side of the second storage unit opposite to the goods outlet and to outside of the second storage unit through the goods outlet in cooperation with the goods transport mechanism; or includes: controlling the rotation state of the roller conveyor, so as to convey goods corresponding to the first storage unit into the first storage unit through the goods outlet and to the outside of the first storage unit through the goods outlet in cooperation with the goods transport mechanism; and conveying goods corresponding to the second storage unit into the second storage unit through the goods outlet of the second storage unit, and conveying the goods to outside of the second storage unit through a side of the second storage unit opposite to the goods outlet.

Alternatively, the roller conveyors 22 corresponding to the storage units rotate independently of each other, so that the storage units can convey corresponding goods independently, and rotation directions of the roller conveyors 22 corresponding to the storage units are the same or different.

Embodiment IV

FIG. 17 is a structural block diagram of a control device according to Embodiment IV of this application. As shown in FIG. 17, this embodiment provides a control device 300. The control device 300 includes:

a processor 301; and a memory 302, communicatively connected to the processor 301, the memory 302 storing executable code, the executable code, when executed by the processor 301, causing the processor 301 to perform the goods loading or unloading control method described in Embodiment III.

The goods loading or unloading control method has been described in detail in Embodiment III, and the details are not described herein again.

Embodiment V

This embodiment provides a goods loading or unloading device, including a support 1 and a control assembly. A storage unit configured for goods to be placed is arranged on the support 1, and a goods outlet and a roller conveyor 22 are arranged on the storage unit. The roller conveyor 22 has an outer contour surface configured for rolling contact with the goods in the storage unit 2.

The control assembly includes a driving unit configured to drive the roller conveyor 22 to rotate and the control device 300 of Embodiment IV. The driving unit is electrically connected to the control device 300. The control device 300 is configured to control a rotation state of the roller conveyor, so as to convey goods to outside of the goods outlet through the storage unit in cooperation with a goods transport mechanism.

The structure and functional principle of the components in the goods loading or unloading device provided in this embodiment are the same as or similar to those of the goods loading or unloading device provided in Embodiment I, and the goods loading or unloading device has been described in detail in Embodiment I. The details are not described herein again. The specific structure and functional principle of the control device 300 have been described in detail in Embodiment IV, and the details are not described herein again.

Embodiment VI

This embodiment provides a warehousing system, including the transport robot 200 of Embodiment I and the goods loading or unloading devices of Embodiment V. As previously described, the transport robot 200 is provided with trays 205. The trays 205 are arranged corresponding to storage units of the goods loading or unloading devices to perform goods loading or unloading operations with the goods loading or unloading device. The trays 205 are arranged corresponding to the storage units of the goods loading or unloading device, which specifically means that the tray 205 and the bottom of each of the storage units are arranged at a substantially same height, at corresponding positions, and opposite to each other.

It should be noted that, the specific structure and functions of the transport robot 200 have been described in Embodiment I, and the specific structures and functions of the goods loading or unloading devices have also been described in detail in Embodiment V. The details are not described herein again.

It should be noted that the transport robot 200 of this application is not limited to the transport robot 200 described in Embodiment I, as long as a tray 205 configured for goods to be loaded is provided, and the tray 205 is arranged corresponding to the storage unit 2 of the goods loading or unloading device.

What is claimed is:

1. A goods loading or unloading control method, applicable to a goods loading or unloading device, wherein the goods loading or unloading device comprises a storage unit, the storage unit is provided with a goods outlet and a roller conveyor, the roller conveyor has an outer contour surface configured for rolling contact with goods in the storage unit, the roller conveyor is configured to rotate about a rotation axis thereof, and the method comprises:

receiving a goods loading or unloading instruction; and controlling a rotation state of the roller conveyor according to the goods loading or unloading instruction, so as to convey goods outside the storage unit to outside of the goods outlet through the storage unit;

wherein before the controlling a rotation state of the roller conveyor according to the goods loading or unloading instruction, the method comprises:

detecting a position of the goods in the storage unit and detecting a movement speed of the goods;

wherein the controlling a rotation state of the roller conveyor according to the goods loading or unloading instruction comprises: controlling the rotation state of the roller conveyor according to at least one of the position of the goods in the storage unit and the movement speed of the goods.

2. The goods loading or unloading control method according to claim 1, wherein the controlling a rotation state of the roller conveyor according to the goods loading or unloading control instruction, so as to convey goods outside the storage unit to outside of the goods outlet through the storage unit comprises:

controlling the roller conveyor to rotate toward the goods outlet according to the goods loading or unloading control instruction, so as to convey the goods from the storage unit to the outside of the goods outlet.

3. The goods loading or unloading control method according to claim 2, wherein before the controlling the roller conveyor to rotate toward the goods outlet according to the goods loading or unloading control instruction, so as to convey the goods from the storage unit to the outside of the goods outlet, the method further comprises:

controlling the roller conveyor to rotate away from the goods outlet, so as to convey the goods from the goods outlet into the storage unit.

4. The goods loading or unloading control method according to claim 1, wherein before the controlling the rotation state of the roller conveyor according to at least one of a position of the goods in the storage unit and a movement speed of the goods, the method further comprises:

detecting the movement speed of the goods.

5. The goods loading or unloading control method according to claim 4, wherein the detecting the movement speed of the goods comprises:

detecting the movement speed of the goods in at least two different positions in the storage unit.

6. The goods loading or unloading control method according to claim 1, further comprises a goods transport mechanism, wherein the goods transport mechanism is located in the goods loading or unloading device, and comprises a manipulator that is movable relative to the storage unit, and the manipulator is configured to move to drive the goods to move; and the method further comprises:

controlling a movement state of the manipulator so that the manipulator and the roller conveyor jointly convey the goods outside the storage unit to the outside of the goods outlet through the storage unit.

7. The goods loading or unloading control method according to claim 6, wherein the controlling a movement state of the manipulator comprises:

controlling a movement speed of the manipulator or a position of the manipulator relative to the storage unit.

8. The goods loading or unloading control method according to claim 6, wherein at least one movable member is arranged on the manipulator, and the at least one movable member is movable relative to the manipulator so that the at least one movable member is arranged at a side of the goods in a conveying direction for blocking, so as to push the goods when the manipulator moves relative to the storage unit; and before the controlling a movement state of the manipulator so that the manipulator and the roller conveyor jointly convey the goods outside the storage unit to the outside of the goods outlet through the storage unit, the method further comprises:

changing positions of at least some movable members relative to the manipulators, so that the at least some movable members are arranged at the side of the goods in the conveying direction for blocking.

9. The goods loading or unloading control method according to claim 1, wherein a plurality of storage units are arranged in a vertical direction; and the controlling a rotation state of the roller conveyor according to the goods loading or unloading instruction, so as to convey goods outside the storage unit to outside of the goods outlet through the storage unit specifically further comprises:

controlling the rotation state of the roller conveyor of each storage unit, so as to convey all goods corresponding to the plurality of storage units into the plurality of storage units through the goods outlet of each storage unit or through a side of each storage unit opposite to the goods outlet.

10. The goods loading or unloading control method according to claim 1, wherein a plurality of storage units are arranged in a vertical direction; the plurality of storage units comprise at least one first storage unit and at least one second storage unit; and the controlling a rotation state of the roller conveyor according to the goods loading or unloading instruction, so as to convey goods outside the storage unit to outside of the goods outlet through the storage unit comprises:

controlling the rotation state of the roller conveyor of the of the at least one first storage unit, so as to convey goods corresponding to the at least one first storage unit into the at least one first storage unit through the goods outlet of the at least one first storage unit and to the outside of the at least one first storage unit through the goods outlet of the at least one first storage unit; and controlling the rotation state of the roller conveyor of the of the at least one second storage unit, so as to convey goods corresponding to the at least one second storage unit into the at least one second storage unit through a side of the at least one second storage unit opposite to the goods outlet of the at least one second storage unit and to outside of the at least one second storage unit through the goods outlet of the at least one second storage unit.

11. The goods loading or unloading control method according to claim 1, wherein a plurality of storage units are arranged in a vertical direction; the plurality of storage units comprise at least one first storage unit and at least one second storage unit; and the controlling a rotation state of the roller conveyor according to the goods loading or unloading instruction, so as to convey goods outside the storage unit to outside of the goods outlet through the storage unit specifically comprises:

controlling the rotation state of the roller conveyor of the at least one first storage unit, so as to convey goods corresponding to the at least one first storage unit into the at least one first storage unit through the goods outlet of the at least one first storage unit and to the outside of the at least one first storage unit through the goods outlet of the at least one first storage unit; and controlling the rotation state of the roller conveyor of the at least one second storage unit, so as to convey goods corresponding to the at least one second storage unit into the at least one second storage unit through the goods outlet of the at least one second storage unit, and to outside of the at least one second storage unit through a side of the at least one second storage unit opposite to the goods outlet of the at least one second storage unit.

12. The goods loading or unloading control method according to claim 1, wherein a plurality of storage units are arranged in a vertical direction; each storage unit of the plurality of storage units corresponds to a roller conveyor, each roller conveyor is independent of each other, so that each of the storage units independently conveys a corresponding goods, and rotation directions of the roller conveyors corresponding to the storage units are the same or different.

13. The goods loading or unloading control method according to claim 1, wherein each storage unit comprises a plurality of roller conveyors arranged side by side in a conveying direction of the goods, the plurality of roller conveyors comprise a driving roller conveyor and a driven roller conveyor that are linked with each other, and the controlling a rotation state of the roller conveyor according to the goods loading or unloading instruction, so as to convey goods outside the storage unit to outside of the goods outlet through the storage unit comprises:

controlling a rotation state of the driving roller conveyor so that the driving roller conveyor and the driven roller conveyor jointly convey the goods.

14. A control device, applicable to a goods loading or unloading device, the goods loading or unloading device comprising a roller conveyor, a speed sensor and a position sensor, wherein the control device comprises:

a processor; and a memory, communicatively connected to the processor, the memory storing executable code, the executable code, when executed by the processor, causing the processor to perform operations of:

receiving a goods loading or unloading instruction; and controlling a rotation state of the roller conveyor according to the goods loading or unloading instruction, so as to convey goods outside a storage unit to outside of a goods outlet through the storage unit;

wherein before the processor controls the rotation state of the roller conveyor, the processor is configured to control the speed sensor to detect a movement speed of the goods, and control the position sensor to detect a position of the goods in the storage unit;

wherein when the processor controls the rotation state of the roller conveyor, the processor is further configured to control the rotation state of the roller conveyor according to at least one of the position of the goods in the storage unit and the movement speed of the goods.

15. A goods loading or unloading device, comprising:

a support, a storage unit arranged on the support, the storage unit being configured for goods to be placed; wherein the storage unit has a goods outlet, the storage unit comprises a roller conveyor, the roller conveyor has an outer contour surface configured for rolling contact with the goods in the storage unit; and a control assembly, comprising a driving unit configured to drive the roller conveyor to rotate, a control device, a speed sensor and a position sensor, wherein the speed sensor and a position sensor are arranged on the storage unit, the driving unit is electrically connected to the control device, and the control device is configured to control the speed sensor to detect a movement speed of the goods, control the position sensor to detect a position of the goods in the storage unit, and control a rotation state of the roller conveyor according to at least one of the position of the goods in the storage unit and the movement speed of the goods, so as to convey the goods to outside of the goods outlet through the storage unit.

16. The goods loading or unloading device according to claim 15, further comprising a first speed sensor arranged on an end of the storage unit and a second speed sensor arranged on another end of the storage unit and opposite to the first speed sensor; wherein the first speed sensor and the second speed sensor are configured to detect movement speed of the goods.

17. The goods loading or unloading device according to claim 15, further comprising a first position sensor arranged on an end of the storage unit, wherein the first position sensor is configured to detect a position of goods in the storage unit.

18. The goods loading or unloading device according to claim 15, wherein the control device is further configured to control the rotation state of the roller conveyor according to a position of the goods in the storage unit, when the goods just start to move, rotation speed of the roller conveyor is controlled to rotate in a first speed, and when the goods are about to move out of the storage unit, the roller conveyor is controlled to rotate in a second speed, the first speed is smaller than the second speed.

19. A warehousing system, comprising:

a goods loading or unloading device, comprising a support, a storage unit, a control device, a speed sensor and a position sensor; wherein the storage unit is arranged on the support, the storage unit comprises a goods outlet and a roller conveyor arranged on the storage unit, the roller conveyor is configured to convey goods placed thereon, the speed sensor and a position sensor are arranged on the storage unit, the control device is configured to control the speed sensor to detect a movement speed of the goods, control the position sensor to detect a position of the goods in the storage unit, and control a rotation state of the roller conveyor according to at least one of the position of the goods in the storage unit and the movement speed of the goods, so as to convey the goods to outside of the goods outlet through the storage unit; and a transport robot, wherein the transport robot is provided with a tray, and the tray is arranged corresponding to the storage unit of the goods loading or unloading device to perform a goods loading or unloading operation with the goods loading or unloading device.

20. The goods loading or unloading control method according to claim 1, wherein the goods loading or unloading device further comprises a first speed sensor and a second speed sensor, the second speed sensor is located on the side of the storage unit opposite to the goods outlet, and the first speed sensor is located between the second speed sensor and the goods outlet, the first speed sensor and the second speed sensor are configured to detect movement speed of the goods;

wherein the detecting a position of the goods in the storage unit and detecting a movement speed of the goods comprises:

controlling the speed sensor to detect a movement speed of the goods, and controlling the position sensor to detect a position of the goods in the storage unit.

* * * * *